US010838718B2

(12) United States Patent
Kimura et al.

(10) Patent No.: US 10,838,718 B2
(45) Date of Patent: Nov. 17, 2020

(54) PROCESSING DEVICE, ARITHMETIC UNIT, AND CONTROL METHOD OF PROCESSING DEVICE

(71) Applicant: FUJITSU LIMITED, Kawasaki (JP)

(72) Inventors: Kouji Kimura, Kokubunji (JP); Shiro Kamoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 122 days.

(21) Appl. No.: 16/132,772

(22) Filed: Sep. 17, 2018

(65) Prior Publication Data

US 2019/0095201 A1    Mar. 28, 2019

(30) Foreign Application Priority Data

Sep. 28, 2017  (JP) .................................. 2017-187438
Sep. 3, 2018   (JP) .................................. 2018-164290

(51) Int. Cl.
*G06F 7/00*     (2006.01)
*G06F 9/30*     (2018.01)

(52) U.S. Cl.
CPC .............. *G06F 9/3001* (2013.01); *G06F 7/00* (2013.01); *G06F 9/30032* (2013.01); *G06F 9/30141* (2013.01); *G06F 9/30167* (2013.01)

(58) Field of Classification Search
CPC .................................... G06F 7/00; G06F 9/30
USPC ........................................................ 712/221
See application file for complete search history.

(56) References Cited

U.S. PATENT DOCUMENTS

| 5,041,999 | A  | * | 8/1991  | Nakayama | ............ G06F 1/0307 |
|           |    |   |         |          | 708/277                   |
| 6,363,476 | B1 | * | 3/2002  | Ide      | .......................... G06F 5/012 |
|           |    |   |         |          | 708/501                   |
| 6,388,672 | B1 | * | 5/2002  | Ide      | ....................... G06F 9/30014 |
|           |    |   |         |          | 345/538                   |
| 6,453,332 | B1 | * | 9/2002  | Shyu     | ..................... G06F 1/0356 |
|           |    |   |         |          | 708/607                   |
| 9,449,198 | B1 | * | 9/2016  | Sun      | ......................... G06F 7/725 |
| 10,101,970| B2 | * | 10/2018 | Fenney   | .................... G06F 7/483 |
| 10,235,135| B2 | * | 3/2019  | Kroener  | .................... G06F 5/01 |
| 10,296,294| B2 | * | 5/2019  | Babinsky | .................. G06F 5/01 |
| 10,303,438| B2 | * | 5/2019  | Babinsky | ................ G06F 7/483 |

(Continued)

OTHER PUBLICATIONS

Patent Abstracts of Japan English abstract for Japanese Patent Publication No. 2002-182904, published Jun. 28, 2002.

*Primary Examiner* — Christopher B Shin
(74) *Attorney, Agent, or Firm* — Staas & Halsey LLP

(57) ABSTRACT

There is provision of a processing device including an instruction decoder and an arithmetic unit configured to process an immediate instruction for instructing a calculation of a product of an immediate value and a constant. In response to receiving the immediate instruction, the instruction decoder generates a first shift control information and a second shift control information based on the constant. The arithmetic unit generates a first shifted value by bit-shifting the immediate value received from the instruction decoder based on the first shift control information, and a second shifted value by bit-shifting the immediate value or a complement of the immediate value based on the second shift control information. By performing an addition of the first shifted value and the second shifted value, the arithmetic unit calculates the product.

9 Claims, 11 Drawing Sheets

(56) References Cited

U.S. PATENT DOCUMENTS

| | | | |
|---|---|---|---|
| 10,340,944 B2* | 7/2019 | Tanaka | H03M 7/6017 |
| 10,489,115 B2* | 11/2019 | Dao | G06F 5/01 |
| 10,514,924 B2* | 12/2019 | Madduri | G06F 9/30036 |
| 2016/0350075 A1* | 12/2016 | Kimura | G06F 7/575 |

* cited by examiner

FIG.6

GrA

P = "VL/E"

| n | VL=$2^n$ | E=8 | E=16 | E=32 | E=64 |
|---|---|---|---|---|---|
| 6 | 64 | 8 | 4 | 2 | 1 |
| 7 | 128 | 16 | 8 | 4 | 2 |
| 8 | 256 | 32 | 16 | 8 | 4 |
| 9 | 512 | 64 | 32 | 16 | 8 |
| 10 | 1024 | 128 | 64 | 32 | 16 |
| 11 | 2048 | 256 | 128 | 64 | 32 |

GrB

P = (Smallest $2^n$ that fulfills "VL/E ≤ $2^n$")

| n | VL=$2^n$ | E=8 | E=16 | E=32 | E=64 |
|---|---|---|---|---|---|
| 6 | 64 | 8 | 4 | 2 | 1 |
| 7 | 128 | 16 | 8 | 4 | 2 |
| 8 | 256 | 32 | 16 | 8 | 4 |
| 9 | 512 | 64 | 32 | 16 | 8 |
| 10 | 1024 | 128 | 64 | 32 | 16 |
| 11 | 2048 | 256 | 128 | 64 | 32 |

GrC

P = "VL/E − (VL/E mod 4)"

| n | VL=$2^n$ | E=8 | E=16 | E=32 | E=64 |
|---|---|---|---|---|---|
| 6 | 64 | 8 | 4 | 0 | 0 |
| 7 | 128 | 16 | 8 | 4 | 0 |
| 8 | 256 | 32 | 16 | 8 | 4 |
| 9 | 512 | 64 | 32 | 16 | 8 |
| 10 | 1024 | 128 | 64 | 32 | 16 |
| 11 | 2048 | 256 | 128 | 64 | 32 |

GrD

P = "VL/E − (VL/E mod 3)"

| n | VL=$2^n$ | E=8 | E=16 | E=32 | E=64 |
|---|---|---|---|---|---|
| 6 | 64 | 6 | 3 | 0 | 0 |
| 7 | 128 | 15 | 6 | 3 | 0 |
| 8 | 256 | 30 | 15 | 6 | 3 |
| 9 | 512 | 63 | 30 | 15 | 6 |
| 10 | 1024 | 126 | 63 | 30 | 15 |
| 11 | 2048 | 255 | 126 | 63 | 30 |

| No. | P | | | $c \times 2^b$ | | SFT1 | SFT2 $(c \times 2^b)$ | CARY |
|---|---|---|---|---|---|---|---|---|
| 1 | 1 | $= 2^a$ | + | $c$ | $\times 2^b$ | | | |
| 1 | 1 | $= 2^0$ | + | 0 | $\times 2^0$ | 0 | 0 (0) | 0 |
| 2 | 2 | $= 2^1$ | + | 0 | $\times 2^0$ | 1 | 0 (0) | 0 |
| 3 | 3 | $= 2^1$ | + | 1 | $\times 2^0$ | 1 | 1 (1) | 0 |
| 4 | 4 | $= 2^2$ | + | 0 | $\times 2^0$ | 2 | 0 (0) | 0 |
| 5 | 5 | $= 2^2$ | + | 1 | $\times 2^0$ | 2 | 1 (1) | 0 |
| 6 | 6 | $= 2^2$ | + | 1 | $\times 2^1$ | 2 | 2 (2) | 0 |
| 7 | 7 | $= 2^3$ | + | −1 | $\times 2^0$ | 3 | 3 (−1) | 1 |
| 8 | 8 | $= 2^3$ | + | 0 | $\times 2^0$ | 3 | 0 (0) | 0 |
| 9 | 16 | $= 2^4$ | + | 0 | $\times 2^0$ | 4 | 0 (0) | 0 |
| 10 | 32 | $= 2^5$ | + | 0 | $\times 2^0$ | 5 | 0 (0) | 0 |
| 11 | 64 | $= 2^6$ | + | 0 | $\times 2^0$ | 6 | 0 (0) | 0 |
| 12 | 128 | $= 2^7$ | + | 0 | $\times 2^0$ | 7 | 0 (0) | 0 |
| 13 | 256 | $= 2^8$ | + | 0 | $\times 2^0$ | 8 | 0 (0) | 0 |
| 14 | 0 | $= 2^0$ | + | −1 | $\times 2^0$ | 0 | 3 (−1) | 1 |
| 15 | 15 | $= 2^4$ | + | −1 | $\times 2^0$ | 4 | 3 (−1) | 1 |
| 16 | 30 | $= 2^5$ | + | −1 | $\times 2^1$ | 5 | 4 (−2) | 1 |
| 17 | 63 | $= 2^6$ | + | −1 | $\times 2^0$ | 6 | 3 (−1) | 1 |
| 18 | 126 | $= 2^7$ | + | −1 | $\times 2^1$ | 7 | 4 (−2) | 1 |
| 19 | 255 | $= 2^8$ | + | −1 | $\times 2^0$ | 8 | 3 (−1) | 1 |

FIG.7

PROCESSING DEVICE, ARITHMETIC UNIT, AND CONTROL METHOD OF PROCESSING DEVICE

CROSS-REFERENCE TO RELATED APPLICATION

This application is based on and claims priority to Japanese Patent Application No. 2017-187438, filed on Sep. 28, 2017, and Japanese Patent Application No. 2018-164290, filed on Sep. 3, 2018, the entire contents of which are incorporated herein by reference.

FIELD

The embodiments discussed herein relate to a processing device, an arithmetic unit, and a control method of the processing device.

BACKGROUND

Some processing devices, such as a CPU (Central Processing Unit), have an instruction pipeline including multiple stages, such as a fetching stage, a decoding stage, and an execution stage. Instructions to be processed by the processing device are processed in each stage. Normally, an operation of each stage requires a single clock cycle. By using the instruction pipeline, multiple instructions are processed in an out-of-order manner. Accordingly, efficiency for processing instructions will improve, as compared to a case in which the instruction pipeline is not employed (multiple instructions are processed in an in-order manner). A processing time of each stage is determined depending on a maximum operable frequency of the stage requiring the longest execution time. That is, the stage requiring the longest execution time is a critical path affecting a maximum operation frequency of a processing device. For instance, if there is a specific process that requires longer processing time than that of other processes in an instruction, the stage for processing the specific process is a critical path and a processing frequency of each stage is determined according to an operable frequency (a processing time) of the stage for processing the specific process. Accordingly, because an operable clock frequency of a processing device supporting an execution of the specific process needs to be lower than an operable clock frequency of a processing device not supporting an execution of the specific process, the performance is degraded.

To counteract the problem, a method for avoiding a performance degradation of a processing device is proposed, by starting an execution of the specific process during a decoding stage before an execution stage (see Patent Document 1, for example). For example, when executing a certain instruction for multiplying data retained in a register and an immediate value, a case may happen in which data obtained by an execution of a preceding instruction is stored into a register to be used by the multiplication operation corresponding to the certain instruction. In this case, an operation of multiplying the data which is to be output to a register from an arithmetic unit executing the preceding instruction by an immediate value retrieved from the certain instruction during a decoding stage is started during the decoding stage.

Suppose a case in which an immediate instruction, for multiplying an immediate value and a constant and for performing an operation of a result of the multiplication and a value retained in a register file, is to be executed by using an arithmetic unit including a multiplier and an adder. First, the immediate value and the constant are multiplied by the multiplier. Next, a result of the multiplication and a value read from the register file are added by the adder, and thereby a result of the immediate instruction is obtained. That is, when the above immediate instruction is to be executed by using an arithmetic unit, the immediate instruction is divided into two steps, and each of the steps is executed sequentially by using a multiplier and an adder respectively. In a case in which an instruction is executed by using an arithmetic unit twice, the number of operations increases as compared to a case in which an instruction is executed by using an arithmetic unit once. Accordingly, a processing time of the instruction becomes longer, and a processing performance degrades.

The following is reference documents: [Patent Document 1] Japanese Laid-Open Patent Publication No. 2002-182904.

SUMMARY

In one embodiment, a processing device includes an instruction decoder configured to generate instruction information by decoding an instruction, an arithmetic unit configured to perform an arithmetic operation based on the instruction information, and a register file configured to retain data used for the arithmetic operation. The instruction decoder includes a shift control unit configured, in a case in which the instruction decoder has decoded an immediate instruction for instructing a calculation of a product of an immediate value and a constant and for instructing an operation of the product and data retained in the register file, to generate a first shift control information and a second shift control information based on the constant. The arithmetic unit includes a first arithmetic operation module configured to calculate the product of the immediate value and the constant, and a second arithmetic operation module configured to perform the operation of the product and the data retained in the register file. The first arithmetic operation module includes a first shift operation unit configured to generate a first shifted value based on the first shift control information, by bit-shifting the immediate value received from the instruction decoder, a second shift operation unit configured to generate a second shifted value based on the second shift control information, which is a value obtained by bit-shifting the immediate value, a value obtained by bit-shifting a complement of the immediate value, or "0", and an add operation unit configured to calculate the product by performing an addition of the first shifted value and the second shifted value.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 6 illustrates examples of a constant that is configured in accordance with a total bit-length used by an immediate instruction and a bit-length of each data used in a SIMD operation;

FIG. 7 is a diagram illustrating a concept of an operation of a shift decoder illustrated in FIG. 4;

DESCRIPTION OF EMBODIMENT

Hereinafter, embodiments of the present disclosure will be described with reference to the drawings. In the following description, to a signal line transmitting a certain signal (or information), a symbol representing the name of the signal (or the information) is attached.

Figure 1:
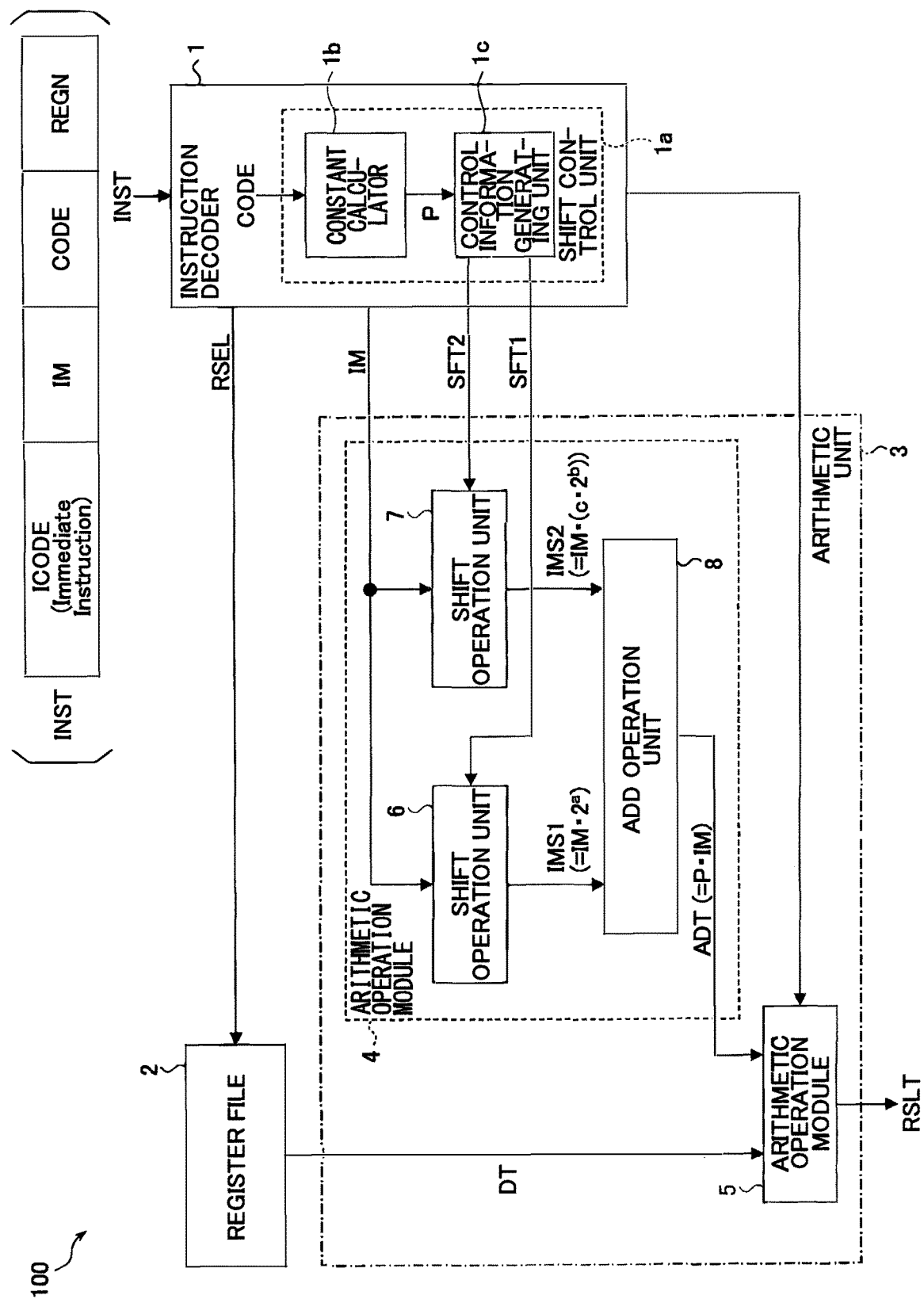
FIG. 1 is a diagram illustrating an embodiment of a processing device, an arithmetic unit, and a control method of the processing device.

FIG. 1 is a diagram illustrating one embodiment of a processing device, an arithmetic unit, and a control method of the processing device. The processing device 100 illustrated in FIG. 1 is a RISC (Reduced Instruction Set Computer) processor, for example, and includes an instruction decoder 1, a register file 2, and an arithmetic unit 3. The processing device 100 is configured, in response to receiving an immediate instruction, to multiply a constant P and an immediate value IM, and to perform an arithmetic operation of a result of the multiplication and data DT retained in the register file 2. The immediate instruction is a type of instruction for performing an arithmetic operation illustrated in the following formula (1), (2), or (3). Instructions for performing the operations indicated in the formulas (1), (2), and (3) include different respective instruction codes. In the following description, "Xs" represents data retained in a register represented by the symbol Xs. "Xd" represents an operating result of an immediate instruction, or a register storing the operating result of the immediate instruction. Further, data retained in a register Xs may be referred to as "data Xs".

$$Xd=P\cdot IM \quad (1)$$

$$Xd=Xs+P\cdot IM \quad (2)$$

$$Xd=Xs-P\cdot IM \quad (3)$$

The instruction decoder 1 decodes an instruction INST that is output from an instruction buffer or the like (not illustrated in the drawing), and generates selection information RSEL and various control information for controlling the arithmetic unit 3 and the like, based on the decoded result. When the instruction decoder 1 decodes an immediate instruction, the instruction decoder 1 generates the selection information RSEL, an immediate value IM, and shift control information SFT1 and SFT2, and the like. The control information, such as the selection information RSEL, and the shift control information SFT1 and SFT2, are output as control signals, for example. As the above mentioned information generated by the instruction decoder 1 is information to cause the arithmetic unit 3 or the like to execute an instruction, the information may also be referred to as "decoded instruction" or "instruction information".

The immediate instruction illustrated in the formula (1) is an instruction for multiplying the immediate value IM and a constant P represented by the following formula (4). The immediate instruction illustrated in the formula (2) is an instruction for multiplying the immediate value IM and a constant P represented by the formula (4) and for adding data DT retained in the register file 2 with the product obtained by the multiplication (=P·IM). The immediate instruction illustrated in the formula (3) is an instruction for multiplying the immediate value IM and a constant P represented by the formula (4) and for subtracting the product obtained by the multiplication (=P·IM) from data DT retained in the register file 2. In the following description, a case in which the immediate instruction illustrated in the formula (2) is executed is mainly described.

$$P=2^a+c\cdot 2^b \quad (4)$$

(Note: a and b are each an integer not less than zero, and c is one of "−1", "0", and "1")

The number of bits of an instruction INST illustrated in FIG. 1 is not limited in particular, but is a fixed value, such as 32 bits, regardless of a type of the instruction INST. In a case in which the instruction INST is an immediate instruction, the instruction INST contains an instruction code ICODE representing that the instruction INST is an immediate instruction, an immediate value IM, a code CODE corresponding to a constant P, and a register number REGN for identifying a register in the register file 2.

The instruction decoder 1 includes a shift control unit 1a which includes a constant calculator 1b and a control information generating unit 1c. The constant calculator 1b calculates a constant P based on the code CODE contained in the immediate instruction. The constant calculator 1b may generate a constant P by referring to a table recording a relation between each code CODE and a corresponding constant P.

The control information generating unit 1c generates the shift control information SFT1 and SFT2, based on the constant P calculated by the constant calculator 1b. That is, the shift control unit 1a generates the shift control information SFT1 and SFT2 based on the constant P, in a case in which the instruction decoder 1 has decoded an immediate instruction. Note that, in a case in which the instruction decoder 1 has decoded an immediate instruction, the instruction decoder 1 outputs the immediate value IM included in the immediate instruction to the arithmetic unit 3. The shift control information SFT1 is an example of first shift control information, and the shift control information SFT2 is an example of second shift control information.

The register file 2 includes multiple registers (not illustrated in FIG. 1). Each of the registers is selected based on the selection information RSEL from the instruction decoder 1. The selection information RSEL is an address, for example, indicating a location in the register file 2 including multiple registers. The register file 2 reads data DT from a register selected based on the selection information RSEL, or stores data that is output from the arithmetic unit 3 into a register selected based on the selection information RSEL.

The arithmetic unit 3 includes arithmetic operation modules 4 and 5. The arithmetic operation module 4 includes shift operation units 6 and 7, and an add operation unit 8. The arithmetic operation module 4 is an example of a first arithmetic operation module, and the arithmetic operation module 5 is an example of a second arithmetic operation module. The shift operation unit 6 is an example of a first shift operation unit, and the shift operation unit 7 is an example of a second shift operation unit. The add operation unit 8 is an example of an add operation unit.

The shift operation unit 6 generates a shifted value IMS1 by shifting the immediate value IM represented as a binary number to upper digits (to the left) by "a" bit, based on the shift control information SFT1. That is, the shift operation unit generates, as the shifted value IMS1, a value obtained by multiplying the immediate value IM by $2^a$ illustrated in the formula (4). The shifted value IMS1 is an example of a first shifted value.

The shift operation unit 7 generates, based on the shift control information SFT2, a shifted value IMS2 which is obtained by shifting the immediate value IM or a complement of the immediate value IM represented as a binary number to upper digits (to the left) by "b" bit, or which is a value "0". That is, the shift operation unit 7 generates, as the shifted value IMS2, a value obtained by multiplying the immediate value IM by $c \cdot 2^b$ illustrated in the formula (4). Note that the shift control information SFT2 includes information indicating which value should be shifted, the immediate value IM or the complement of the immediate value IM.

The add operation unit 8 is configured to generate an added value ADT by adding the shifted values IMS1 and IMS2. The add operation unit 8 is a full adder, for example. Note that the added value ADT is, as illustrated in the following formula (5), a product (=IM·P) of the immediate value IM and the constant P.

$$ADT = IM \cdot 2^a + IM \cdot (c \cdot 2^b) = IM \cdot (2^a + c \cdot 2^b) = IM \cdot P \qquad (5)$$

The arithmetic operation module 5 has two inputs, performs an operation of the added value ADT and data DT retained in, for example, a register Xs selected from the register file 2 based on the selection information RSEL, and outputs data obtained by the operation as an operation result RSLT. In a case in which the arithmetic operation module 5 executes the immediate instruction illustrated in the formula (2), the arithmetic operation module 5 outputs a value obtained by adding the data DT and the added value ADT as the operation result RSLT. In a case in which the arithmetic operation module 5 executes the immediate instruction illustrated in the formula (3), the arithmetic operation module 5 outputs a value obtained by subtracting the added value ADT from the data DT as the operation result RSLT. In a case in which the arithmetic operation module 5 executes the immediate instruction illustrated in the formula (1), the arithmetic operation module 5 does not use the data DT retained in the register file 2. Instead, the arithmetic operation module 5 outputs a value obtained by adding "0" and the added value ADT as the operation result RSLT. The operation result RSLT is stored in a register in the register file 2 that is indicated by a symbol Xd. The arithmetic operation module 5 performs an arithmetic operation regarding an immediate instruction by using, for example, a full adder in the arithmetic operation module 5.

The arithmetic operation module 5 includes, in addition to the full adder, a multiplier, a divider, a logical operation element, or the like. When the arithmetic operation module 5 executes instructions other than the immediate instruction, such as a multiplication instruction or an addition instruction, the arithmetic operation module 5 performs an operation of two data DT retained in two registers selected from the register file 2 based on two selection information pieces RSELs.

Figure 2:
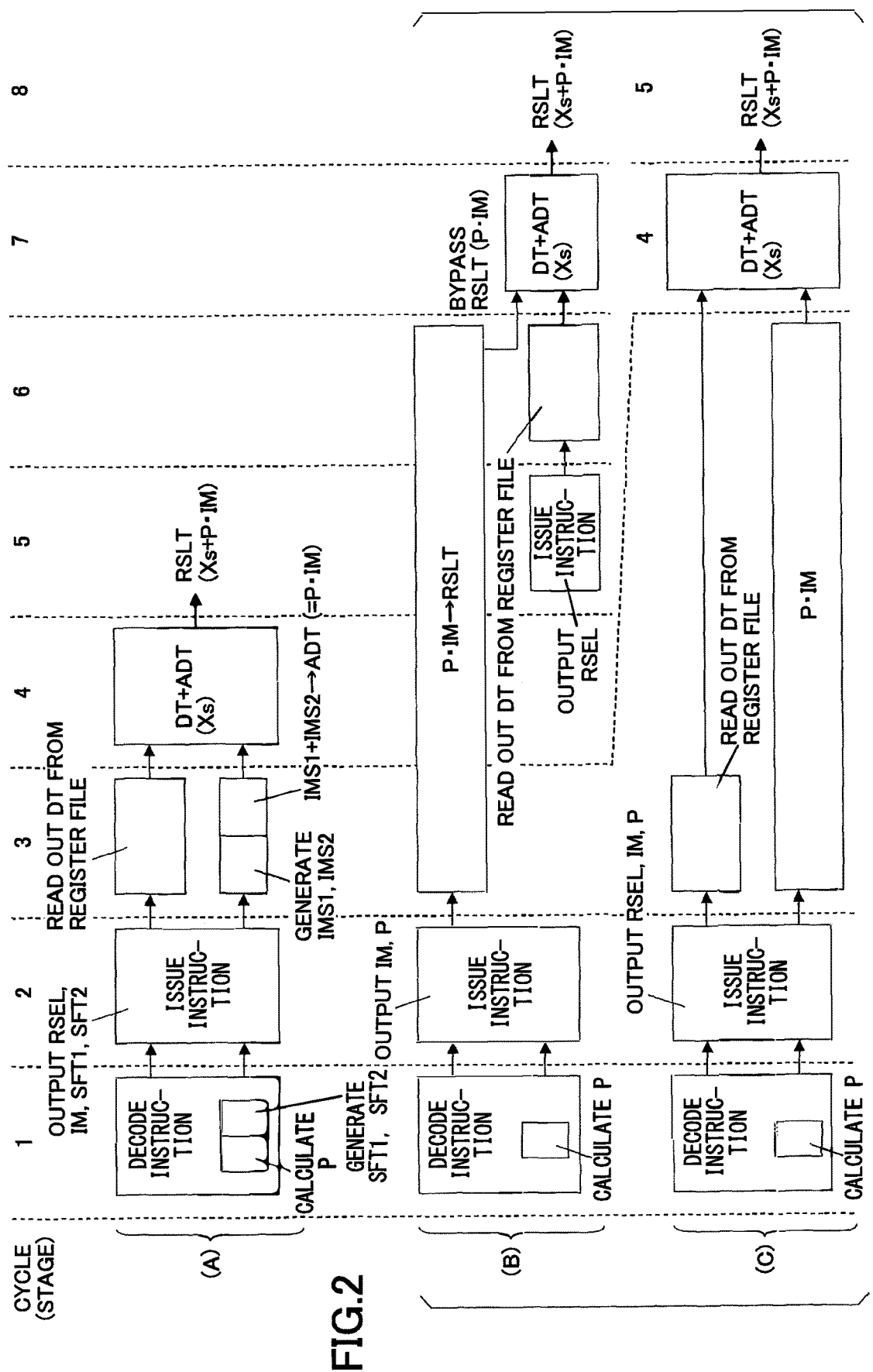
FIG. 2 is a diagram illustrating an example of operation of the processing device when an immediate instruction is executed.

FIG. 2 is a diagram illustrating an example of an operation of the processing device 100 illustrated in FIG. 1 when an immediate instruction is executed. That is, FIG. 2 illustrates an example of a control method of the processing device 100. A row (A) in FIG. 2 is a diagram illustrating an operation (hereinafter referred to as an "operation (A)") of the processing device 100 according to the present embodiment, and rows (B) and (C) in brackets illustrate other examples of operations, which are comparative examples. Note that the processing device 100 includes an instruction pipeline having multiple stages, and each step of an instruction is processed in a corresponding stage. In each of the stages, an instruction is processed in a single cycle (1 clock cycle, for example).

First, a flow of the operation (A) will be described. At cycle 1 (this is an instruction decoding stage), the instruction decoder 1 decodes a received immediate instruction, generates the selection information RSEL and the immediate value IM, calculates the constant P by using the constant calculator 1b, and generates the shift control information SFT1 and SFT2 by using the control information generating unit 1c. Because the constant calculator 1b is provided in the instruction decoder 1, the constant P can be calculated at the instruction decoding stage, even in a case in which an encoded constant P is stored in the immediate instruction. Also at the instruction decoding stage, the control information generating unit 1c can generate the shift control information SFT1 and SFT2 based on the constant P calculated by the constant calculator 1b. Because the constant P and the shift control information SFT1 and SFT2 can be generated at the instruction decoding stage, a delay of inputting the decoded instruction to the arithmetic unit 3 can be prevented at cycle 2 to be described below. As a result, the immediate instruction can be processed without extending a processing time in each stage.

Next, at cycle 2, the instruction decoder 1 issues instructions (decoded instructions) by outputting the selection information RSEL, the immediate value IM, and the shift control information SFT1 and SFT2. Next, at cycle 3, the register file 2, which has received the selection information RSEL, reads out data DT from a register indicated by the selection information RSEL, and outputs the data DT to the arithmetic unit 3. Also at cycle 3, the shift operation unit 6 in the arithmetic operation module 4 performs an operation for shifting the immediate value IM based on the shift control information SFT1, to generate the shifted value IMS1. Further, the shift operation unit 7 in the arithmetic operation module 4 performs an operation for shifting the immediate value IM based on the shift control information SFT2, to generate the shifted value IMS2. The add operation unit 8 in the arithmetic operation module 4 generates the added value ADT (which corresponds to P·IM) by adding the shifted values IMS1 and IMS2 respectively output from the shift operation units 6 and 7.

A product of the constant P and the immediate value IM is calculated by the arithmetic operation module 4 including the two shift operation units 6 and 7 and the add operation unit 8, not by a multiplier having a CSA (Carry Save Adder) which adds, for each digit, multiple partial products each of which is obtained by multiplying a multiplicand by each digit of a multiplier. In other words, the arithmetic operation module 4 can realize a multiplication operation of "P·IM" by performing shift operations of the immediate value IM and an addition operation of the shifted values IMS1 and IMS2 obtained by the shift operations.

Logic depth of the arithmetic operation module 4 is smaller than that of a multiplier implemented by a CSA. By performing the multiplication operation of "P·IM" using the arithmetic operation module 4 not having a CSA, the multiplication operation of "P·IM" can be executed during a cycle of reading data DT from the register file 2 (cycle 3). That is, the multiplication operation of "P·IM" can be executed in parallel with the process for reading data DT from the register file 2.

Next, at cycle 4, the adder in the arithmetic operation module 5 performs an operation of the added value ADT from the arithmetic operation module 4 and the data DT (Xs) from the register file 2, such as an addition operation. Subsequently, at cycle 5, an operation result RSLT of the immediate instruction designated by the formula (1), (2), or (3) (such as Xs+P·IM) is output from the arithmetic unit 3, and is stored into the register Xd in the register file 2. An execution of the immediate instruction is completed in 5 cycles, similarly to an execution of an addition instruction performed by the adder in the arithmetic operation module 5.

The operation (B) in the bracket represents an example of an execution of an immediate instruction by not using the arithmetic operation module 4 (but the arithmetic operation module 5 is used). A flow of the operation (B) will be described below. First, at cycle 1, the instruction decoder 1 decodes a received immediate instruction, generates the selection information RSEL and the immediate value IM, and calculates the constant P. In the operation (B), the instruction decoder 1 does not generate the shift control information SFT1 and SFT2.

Next, at cycle 2, the instruction decoder 1 issues decoded instructions to a multiplier in the arithmetic operation module 5 by outputting the immediate value IM and the constant P to the arithmetic operation module 5. In response to the issuance, a first flow is started. Next, in cycles 3 to 6, the multiplier calculates a product of the constant P and the immediate value IM, and an operation result RSLT (=P·IM) is obtained at cycle 6. The multiplier includes, for example, a CSA. In a CSA, because logic depth of an adder becomes larger as the number of partial products increase, a time for executing an operation becomes longer. Accordingly, an operation (multiplication) of the multiplier is executed over multiple cycles (multiple stages). The operation result RSLT (=P·IM) is bypassed to the adder in the arithmetic operation module 5 before a termination of cycle 6.

Further, at cycle 5, the instruction decoder 1 issues an instruction to the register file 2 by outputting the selection information RSEL. In response to the issuance, a second flow is started. The processing device 100 has an execution control unit, such as a reservation station (not illustrated in FIG. 1), for retaining various control signals (decoded instructions) that were output from the instruction decoder 1, and for outputting the retained control signals to the arithmetic unit 3 in the order that the arithmetic unit 3 can execute. The execution control unit outputs the selection information RSEL at cycle 5. At cycle 6, the register file 2, which has received the selection information RSEL, reads out data DT from a register indicated by the selection information RSEL, and outputs the data DT to the arithmetic operation module 5.

At cycle 7, the adder in the arithmetic operation module 5 adds the operation result RSLT (=P·IM) bypassed from the multiplier and the data DT (Xs) output from the register file 2. Subsequently, at cycle 7, the operation result RSLT (such as Xs+P·IM) is output from the arithmetic unit 3, and is stored into the register Xd in the register file 2. An execution of an immediate instruction is completed in 5 cycles, similarly to an execution of an addition instruction performed by the adder in the arithmetic operation module 5. In the operation (B), a process concerning an immediate instruction is divided into two process flows, and each process flow is executed sequentially using the multiplier and the adder in the arithmetic operation module 5. Accordingly, it takes 7 cycles to complete an execution of the operation (B).

The operation (C) in the bracket represents an example in which a processing device having a multiplier implemented by a CSA instead of the arithmetic operation module 4 executes an immediate instruction (multiplication (=P·IM)).

A flow of the operation (C) will be described below. First, at cycle 1, an instruction decoder receives an instruction INST (immediate instruction), decodes the received immediate instruction, generates the selection information RSEL and the immediate value IM, and calculates the constant P. The instruction decoder does not generate the shift control information SFT1 and SFT2. Next, at cycle 2, the instruction decoder issues instructions to a register file and a multiplier for executing multiplication (P·IM) by outputting the selection information RSEL, the immediate value IM, and the constant P.

Next, at cycle 3, the register file, which has received the selection information RSEL, reads out data DT (Xs) from a register indicated by the selection information RSEL, and outputs the data DT to an adder included in an arithmetic operation module which is similar to the arithmetic operation module 5 in FIG. 1. Also at cycle 3, the multiplier for executing multiplication (P·IM) performs multiplication of the constant P and the immediate value IM received from the instruction decoder, and obtains a result of the multiplication. However, similar to the operation (B), in a multiplier implemented by a CSA, it takes 4 cycles to perform the multiplication operation (P·IM). In the instruction pipeline, each stage is designed such that an execution time of every stage is the same as an execution time of a stage requiring the longest execution time. Thus, the processing device performing the operation (C) is configured such that an execution time of each stage is four times longer than an execution time of a stage in the operation (A) or (B).

Next, at cycle 4, an adder in the arithmetic operation module adds the result of multiplication (P·IM) received from the multiplier and the data DT (Xs) received from the register file. Subsequently, at cycle 5, the operation result RSLT (such as Xs+P·IM) is output from an arithmetic unit, and is stored into a register Xd. In the operation (C) illustrated in the brackets, an immediate instruction is completed in 5 cycles. However, in the operation (C), as an execution time of each stage is four times longer than an execution time of a stage in the operation (A) or (B), a time corresponding to 20 cycles in the operation (A) or (B) is required to execute an immediate instruction.

As described above, in the embodiment illustrated in FIG. 1, when an immediate instruction of which a constant P can be represented as "$2^a + c \cdot 2^b$" is to be executed, the arithmetic operation module 4 performing a multiplication operation of "P·IM" can be embodied by the two shift operation units 6 and 7 and the add operation unit 8. That is, a circuit scale (logic depth) of the arithmetic operation module 4 performing a multiplication operation of "P·IM" can be reduced, as compared to a circuit scale (logic depth) of a multiplier implemented by a CSA. Further, because the multiplication operation "P·IM" is performed by the two shift operation units 6 and 7 and the add operation unit 8, the execution of the multiplication operation "P·IM" can be completed during a cycle for reading data DT from the register file 2. In other words, without extending a processing time in each stage of the instruction pipeline in the processing device 100, the arithmetic operation module 4 performing a multiplication operation of "P·IM" can be added to the processing device 100. As a result, an execution of an immediate instruction for performing a multiplication of the immediate value IM and the constant P and for performing an operation of a result of the multiplication and data DT retained in the register file 2 can be executed in the same number of cycles as that of an addition instruction executed by an adder in the arithmetic operation module 5. That is, when the immediate instruction is to be executed, the immediate instruction can be executed in shorter time than the operation (B) or (C) illustrated in FIG. 2.

By providing the constant calculator 1b in the instruction decoder 1, even in a case in which an encoded constant P is embedded in an immediate instruction, the constant P can be calculated (by the constant calculator 1b) during a stage at which the instruction decoder 1 decodes an instruction (=cycle 1). Further, the control information generating unit 1c in the instruction decoder 1 can generate the shift control information SFT1 and SFT2 based on the constant P calculated by the constant calculator 1b. Accordingly, the constant P can be calculated and the shift control information SFT1 and SFT2 can be generated before starting a cycle for reading out data DT from the register file 2. As a result, a multiplication operation of "P·IM" can be executed during the cycle for reading out data DT from the register file 2.

Figure 3:
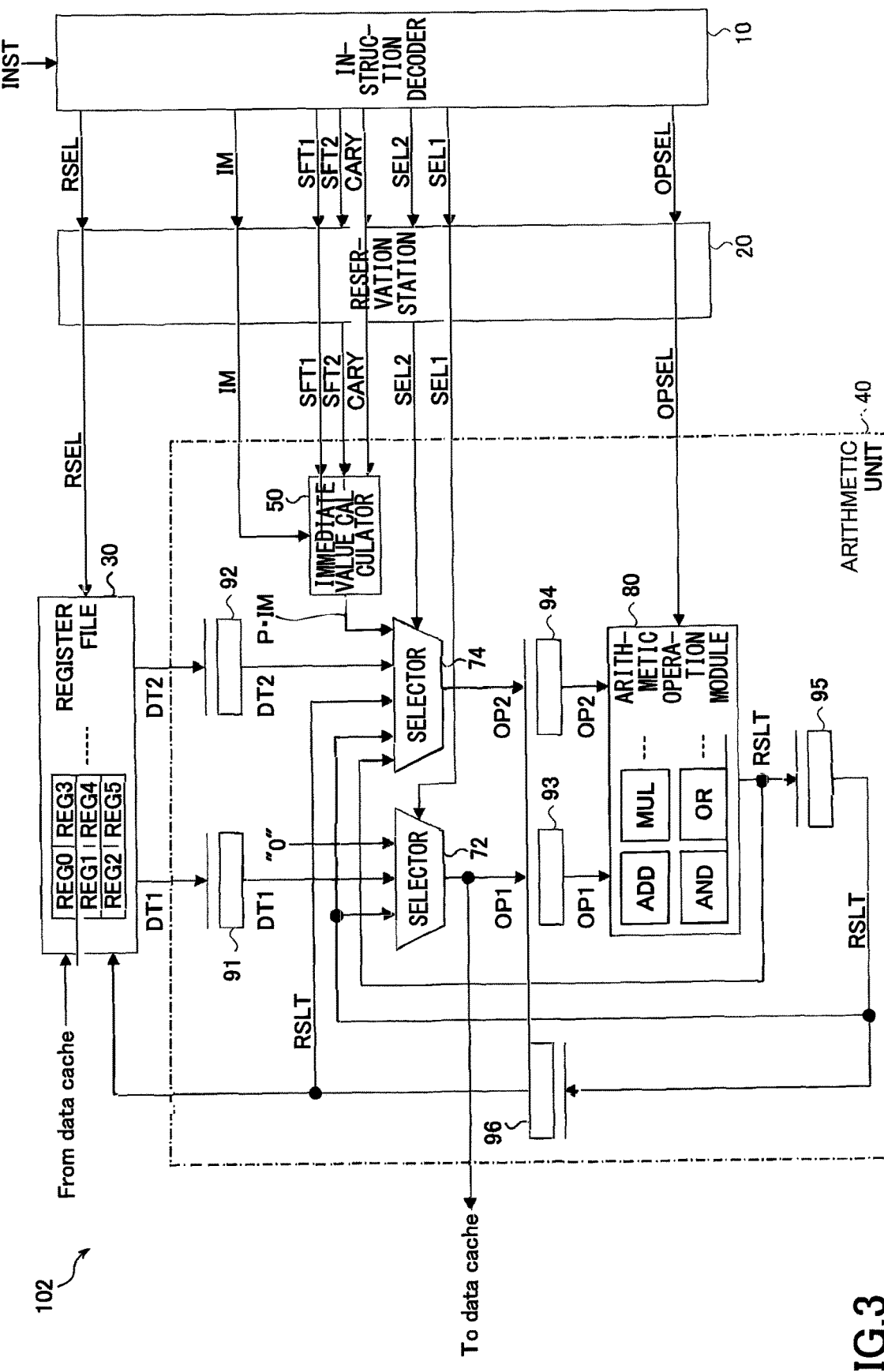
FIG. 3 is a diagram illustrating another embodiment of a processing device, an arithmetic unit, and a control method of the processing device.

FIG. 3 is a diagram illustrating another embodiment of a processing device, an arithmetic unit, and a control method of the processing device. With respect to the same element as that illustrated in FIG. 1, or with respect to a similar element to that illustrated in FIG. 1, the same or similar reference symbol is attached, and the detailed description of the element will be omitted. A processing device 102 illustrated in FIG. 3 is a RISC processor, for example, and includes an instruction decoder 10, a reservation station 20, a register file 30, and an arithmetic unit 40. The arithmetic unit 40 includes an immediate value calculator 50, selectors 72 and 74, an arithmetic operation module 80, and multiple registers 91, 92, 93, 94, 95, and 96. Note that, except the immediate value calculator 50, each component in the arithmetic unit 40 includes multiple processing elements for processing a vector of data in parallel, to enable SIMD (Single Instruction Multiple Data) operations.

The immediate value calculator 50 is an example of a first arithmetic operation unit, and the arithmetic operation module 80 is an example of a second arithmetic operation unit. Each of the registers 91, 92, 93, 94, 95, and 96 includes a latch circuit to retain data or the like in synchronization with a clock signal, and is provided at a boundary between stages of an instruction pipeline.

The instruction decoder 10 decodes an instruction INST that is output from an instruction buffer or the like (not illustrated in the drawing), and generates selection information RSEL for controlling an operation of the register file 30 and other various control information for controlling the arithmetic unit 40 and the like, based on a result of the decoding. A format of the instruction INST is similar to the instruction INST illustrated in FIG. 1, and the instruction INST of the present embodiment also includes an instruction code ICODE, and a given number of parameters corresponding to the instruction code ICODE, such as a register number REGN. The number of bits of the instruction INST is fixed, such as 32 bits, regardless of a type of the instruction INST. The control information includes shift control information SFT1 and SFT2, carry information CARY, and selection information RSEL, SEL1, SEL2, and OPSEL, which are output as signals.

When the instruction decoder 10 decodes an immediate instruction that uses the immediate value calculator 50 for performing an arithmetic operation, the instruction decoder 10 generates the selection information RSEL, an immediate value IM, the shift control information SFT1 and SFT2, the carry information CARY, and the selection information SEL1, SEL2, and OPSEL. A format of the immediate instruction is the same as that illustrated in FIG. 1, and the immediate instruction includes the instruction code ICODE, the immediate value IM, a code CODE corresponding to a constant P, and the register number REGN. The immediate instruction is a type of instruction for performing an arithmetic operation illustrated in the above mentioned formula (1), (2), or (3), and the constant P is a value represented by the above mentioned formula (4).

When the instruction decoder 10 decodes an instruction such as a multiplication instruction or an addition instruction, which uses the arithmetic operation module 80 for performing an arithmetic operation and which does not use the immediate value calculator 50 for performing an arithmetic operation, the instruction decoder 10 generates the selection information RSEL, SEL1, SEL2, OPSEL, and the like. Note that the immediate value IM, the shift control information SFT1 and SFT2, and the carry information CARY are not generated. As the information output by the instruction decoder 10 is information to cause the arithmetic unit 40 to execute an instruction, the information may also be referred to as "instruction information". An example of the instruction decoder 10 is described in FIG. 4.

The reservation station 20 includes multiple buffer regions to retain sets of instruction information that are output from the instruction decoder 10, and outputs the sets of the instruction information retained in the buffer regions in the order in which the arithmetic unit 40 can execute. The reservation station 20 controls an out-of-order execution of instructions, by changing orders of the instructions to be executed in the arithmetic unit 40 based on data dependency. The reservation station 20 is an example of an execution control unit.

The register file 30 includes multiple registers REG(s) (REG0, REG1, REG2, . . . ) that are selected based on the selection information RSEL (such as an address). The register file 30 reads out data (DT1 or DT2) from a register REG indicated by the selection information RSEL, and outputs the read data to either of the registers 91 and 92 based on the selection information RSEL. The register file 30 also store an operation result RSLT output from the register 96, or data output from a data cache (not illustrated) into the register REG indicated by the selection information RSEL.

To perform operations of multiple data simultaneously in an execution of a single instruction, multiple data is stored in each of the registers REGs in the register file 30. That is, each of the registers REGs is a vector register for a SIMD operation. Although each of the registers REGs is configured such that either of a floating-point number and a fixed-point number can be stored in each of the registers REGs, fixed-point numbers are stored in the register REG when an immediate instruction is executed. When fixed-point numbers are to be stored to the register REG, multiple data of the same length (8 bits, 16 bits, 32 bits, or 64 bits) are stored. The number of data stored in the register REG will be described below with reference to FIG. 6. Note that the register file 30 includes a register for integer data, in addition to the register REG for SIMD operations.

The immediate value calculator 50 calculates a product of the immediate value IM and the constant P illustrated in the above mentioned formula (1), (2), or (3), and outputs the calculated product to the selector 74. An example of the immediate value calculator 50 will be described below with reference to FIG. 5.

The selector 72 selects either one of data output from the registers 91 and 95, and "0", based on the selection information SEL1, and outputs the selected data to the register 93 as operand data OP1. The data selected by the selector 72 may be output to the data cache as well. The selector 74 selects any one of data that are output from the immediate value calculator 50 and the registers 92, 95 and 96, based on the selection information SEL2, and the selector 74 outputs the selected data to the register 94 as operand data OP2. The operand data OP1 and OP2 respectively retained in the registers and 94 are output to the arithmetic operation module 80.

The arithmetic operation module 80 includes multiple operation elements, such as an adder ADD, a multiplier MUL, an AND gate AND, and an OR gate OR. For example, the adder ADD is a full adder which has two data inputs, and performs an addition operation of the fixed-point operand data OP1 and OP2 output from the registers 93 and 94 respectively. The adder ADD outputs the data obtained by the addition to the register 95 as the operation result RSLT. Types of operation elements included in the arithmetic operation module 80 are not limited to the operation elements illustrated in FIG. 3, and the arithmetic operation module 80 may include other operation elements, such as a divider DIV or a shifter SFT. The arithmetic operation module 80 may also include an operation element performing a floating-point operation. The register 95 retains the operation result RSLT output from the arithmetic operation module 80, and outputs the operation result RSLT to the register 96 which is a register for relaying information to the register file 30.

Figure 4:
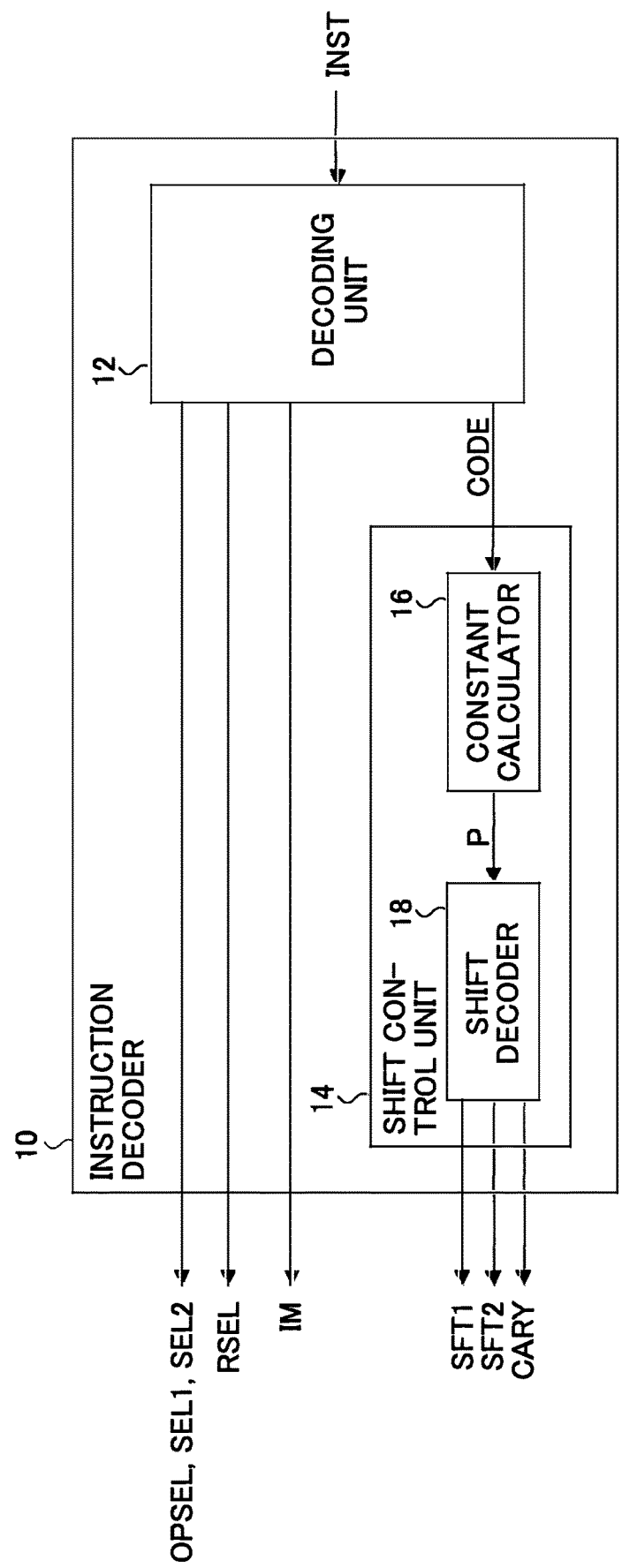
FIG. 4 is a diagram illustrating an example of an instruction decoder illustrated in FIG. 3.

FIG. 4 is a diagram illustrating an example of the instruction decoder 10 illustrated in FIG. 3. The instruction decoder 10 includes a decoding unit 12 and a shift control unit 14. The shift control unit 14 includes a constant calculator 16 and a shift decoder 18. The shift decoder 18 is an example of a control information generating unit.

The decoding unit 12 decodes a received instruction INST, and outputs the selection information OPSEL, SEL1, and SEL2. When a register number REGN is included in a received instruction INST, the decoding unit 12 generates the selection information RSEL based on the register number REGN. When a received instruction INST is an immediate instruction, the decoding unit 12 retrieves and outputs an immediate value IM and a code CODE that are contained in the instruction INST.

The constant calculator 16 in the shift control unit 14 calculates the constant P based on the code CODE contained in the immediate instruction. The constant calculator 16 may generate a constant P by referring to a table recording a relation between each code CODE and a corresponding constant P. The shift decoder 18 generates the carry information CARY and the shift control information SFT1 and SFT2, based on the constant P calculated by the constant calculator 16. An example of the shift decoder 18 will be described below with reference to FIG. 7.

Figure 5:
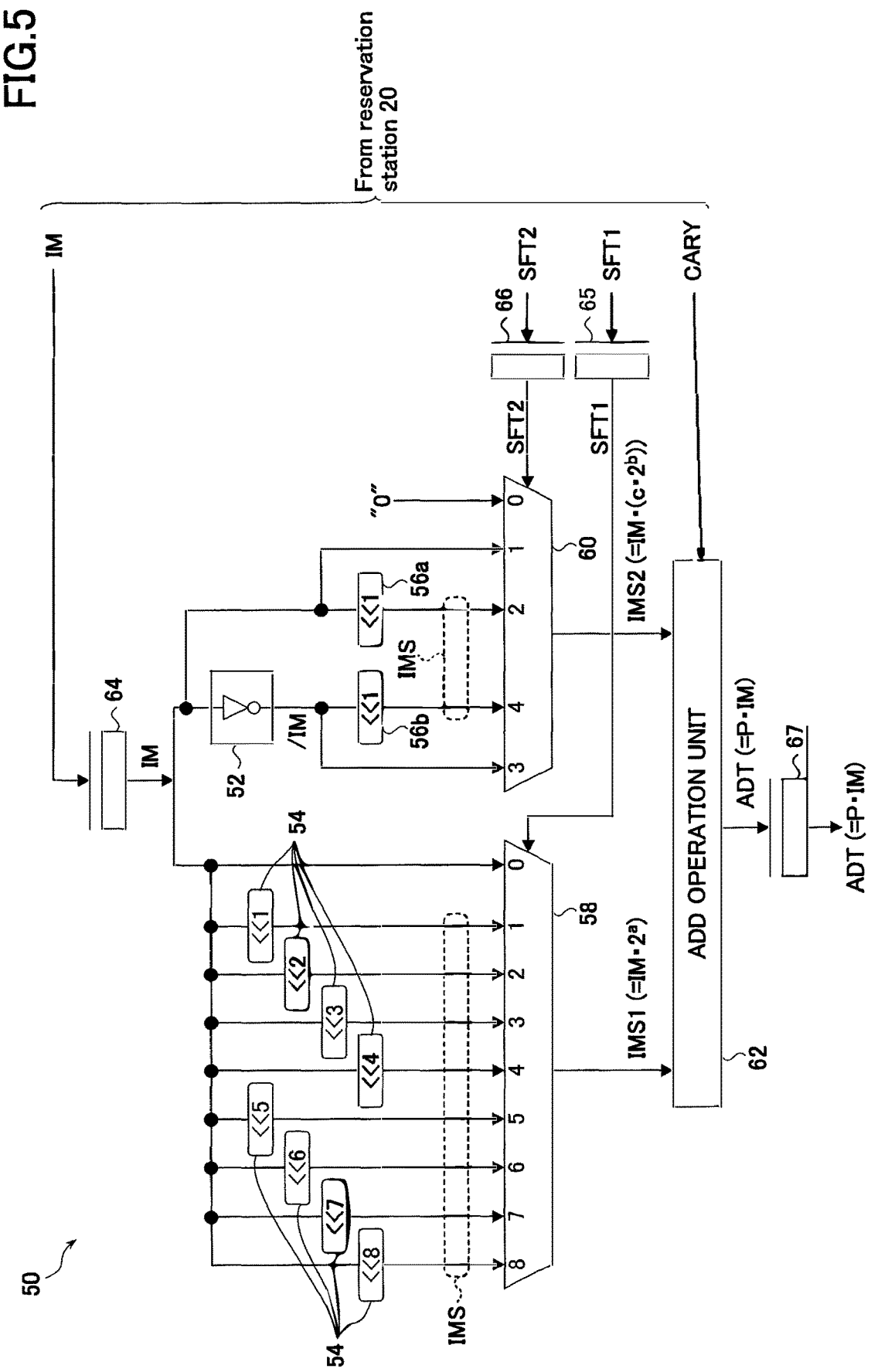
FIG. 5 is a diagram illustrating an example of an immediate value calculator illustrated in FIG. 3.

FIG. 5 is a diagram illustrating an example of the immediate value calculator 50 illustrated in FIG. 3. The immediate value calculator 50 includes a complement generator 52, multiple shifters 54, shifters 56a and 56b, selectors 58 and 60, an add operation unit 62, and multiple registers 64, 65, 66, and 67. The shifters are an example of a first shifter, the shifter 56a is an example of a second shifter, and the shifter 56b is an example of a third shifter. The selector 58 is an example of a first selector, and the selector 60 is an example of a second selector. A set of the shifters 54 and the selector 58 is an example of a first shift operation unit, and a set of the complement generator 52, the shifters 56a and 56b, and the selector 60 is an example of a second shift operation unit. The add operation unit 62 is an example of an add operation unit.

The complement generator 52 receives the immediate value IM from the reservation station 20 via the register 64, generates a complement (ones' complement) of the immediate value IM by inverting each bit of the immediate value IM (hereinafter, the complement (ones' complement) of the immediate value IM will be denoted as a "complement/IM"), and outputs the generated complement/IM to the shifter 56b and the selector 60.

It should be noted that the complement generator 52 attaches an additional bit "0" to the right side (a side of the least significant bit) of input data of the complement generator 52 (the immediate value IM) and that the complement generator 52 generates a complement (ones' complement) of the input data to which the additional bit is attached.

For example, when the input data (the immediate value IM) is "0011" in a binary representation, the complement generator 52 inverts each bit in a bit string (00110) which is made by attaching "0" to the right of the least significant bit (LSB) of "0011". That is, when the input data is "0011", the complement generator 52 outputs "11001" as the complement/IM.

Note that the additional bit "0" attached in the complement generator 52 (which will be inverted to "1" as a result of calculation by the complement generator 52) will be used in the shifter 56b. As the additional bit is unnecessary after calculation by the shifter 56b is completed, the additional bit is discarded when the complement/IM is input to the selector 60. Details will be described below.

Each of the shifters 54 performs a shift operation of the immediate value IM from the reservation station 20 via the register 64. In FIG. 5, a symbol followed by a numeral, such as "«1", is described at each of the shifters 54. This number described at the shifter 54 represents the number of bit(s) by which the immediate value IM is shifted to the left (to upper digit(s)). The shifters 54 are provided in the immediate value calculator 50 to calculate a product (IM·$2^a$) of the immediate value IM and one of the terms ($2^a$) contained in the formula (4) (note that "a" is an integer greater than 0). For example, a shifter 54 labeled "«8" causes the immediate value IM (in a binary expression) to be shifted to the left by 8 bits, to generate a shifted value IMS. According to the shift operation, the shifted value IMS which is 256 times the immediate value IM is generated. A shifter 54 labeled "«2" generates a shifted value IMS by shifting the immediate value IM (in a binary expression) to the left by 2 bits. According to the shift operation, the shifted value IMS which is 4 times the immediate value IM is generated. Although the shifters 54 in FIG. 5 are configured to shift the immediate value IM to the left by only up to 8 bits, the immediate value calculator 50 in FIG. 5 may include a shifter 54 configured to shift the immediate value IM by more than 8 bits to the left.

Conversely, the immediate value calculator 50 can include only one shifter 54 if the constant P specified by the immediate instruction (calculated by the code CODE contained in the immediate instruction) is limited to specific values. For example, if the constant P specified by the immediate instruction is limited to values that can be expressed as "P=$2^2$+c·$2^b$" (which is a case when the constant P is represented by the above formula (4) and which is a case when a=2, b is an integer not less than zero, and c is one of "−1", "0", and "1"), the immediate value calculator 50 may include only a shifter 54 shifting the immediate value IM to the left by 2 bits.

The selector 58 selects one of the immediate value IM and the multiple shifted values IMS(s) based on the shift control information SFT1, and outputs the selected value as a shift value IMS1. The selector 58 includes nine input terminals which are for receiving the immediate value IM and the multiple shifted values IMS(s) respectively, in addition to a signal input terminal for receiving the shift control information SFT1. In the following description regarding the selector 58, an input terminal for receiving the immediate value IM is denoted as a "terminal 0", and an input terminal for receiving the shifted value IMS that is output from a shifter 54 labeled "«n" is denoted as a "terminal n" (note: "n" is an integer from 1 to 8). The shift control information SFT1 received by the selector 58 is one of values (integers) from "0" to "8". In a case in which the received shift control information SFT1 is "a" (note that "a" is an integer from 0 to 8), the selector 58 selects, as value to be output, the value received by the "terminal a".

That is, a set of the shifters 54 and the selector calculates and outputs (IM·$2^a$) in the formula (5).

The shifter 56$a$ causes the immediate value IM received from the reservation station 20 via the register 64 to be shifted to the left (in a binary expression) by 1 bit, and outputs the shifted value of the immediate value IM as the shifted value IMS. That is, as a result of the shift operation, the shifter 56$a$ calculates a product of the immediate value IM and a term "c·$2^b$" in the formula (4) (where c is "1" and b is "1").

The shifter 56$b$ causes the complement/IM received from the complement generator 52 to be shifted to the left (in a binary expression) by 1 bit, and outputs the shifted value as the shifted value IMS. When the shifter 56$b$ shifts the complement/IM, the additional bit ("1") that was attached by the complement generator 52 is also shifted to the left. After the shift operation, a bit in the rightmost position of the shifted data (a bit corresponding to the additional bit) is discarded (is not output from the shifter 56$b$). For example, in a case in which the complement/IM received from the complement generator 52 is "11001" in a binary representation (note that the rightmost bit "1" is the additional bit and the original immediate value IM is 4-bit data), the shifter 56$b$ calculates "10010" by shifting "11001" to the left, and outputs upper four bits of this calculated result (10010) as the shifted value IMS (that is, the shifted value IMS will be "1001"). Accordingly, as a result of the shift operation, the shifter 56$b$ calculates a value corresponding to a product corresponding to a term "IM·c·$2^b$" in the formula (4) (where c is "−1" and b is "1").

In the example illustrated in FIG. 5, the shifter 56$a$ generates, as the shifted value IMS, a doubled value of the immediate value IM, and the shifter 56$b$ generates, as the shifted value IMS, a doubled value of the complement/IM. Note that the immediate value calculator 50 may also include a shifter 56$a$ configured to shift the immediate value IM to the left by more than one bit. Also, the immediate value calculator 50 may also include a shifter 56$b$ configured to shift the complement/IM to the left by more than one bit. If the immediate value calculator 50 includes a shifter 56$b$ configured to shift the complement/IM to the left by more than one bit, the complement generator 52 attaches multiple additional bits. For example, in a case in which the immediate value calculator 50 includes a shifter 56$b$ for shifting the complement/IM to the left by n bits (where n is an integer more than 1), the complement generator 52 attaches n bits of "0" to the right of the immediate value IM and performs calculations of a complement (ones' complement). Further, the immediate value calculator 50 may include multiple shifters 56$a$ each of which is configured to shift the immediate value IM by a different amount of bits from any other of the shifters 56$a$. Similarly, the immediate value calculator 50 may include multiple shifters 56$b$ each of which is configured to shift the complement/IM by a different amount of bits from any other of the shifters 56$b$.

The selector 60 selects one of the following five values (the shifted value IMS output from the shifter 56$a$, the shifted value IMS output from the shifter 56$b$, the immediate value IM, the complement/IM, and "0") based on the shift control information SFT2, and outputs the selected value as a shift value IMS2. The selector 60 includes five input terminals which are for receiving the above five values, in addition to a signal input terminal for receiving the shift control information SFT2. In the following description regarding the selector 60, as illustrated in FIG. 5, an input terminal for receiving "0" is denoted as a "terminal 0", an input terminal for receiving the immediate value IM is denoted as a "terminal 1", an input terminal for receiving the shifted value IMS of the immediate value IM is denoted as a "terminal 2", an input terminal for receiving the complement/IM is denoted as a "terminal 3", and an input terminal for receiving the shifted value IMS of the complement/IM is denoted as a "terminal 4". In a case in which the received shift control information SFT2 is "b" (note that "b" is an integer from 0 to 4), the selector 60 selects, as value to be output, the value received by the "terminal b". That is, a set of the complement generator 52, the shifter 56$a$, the shifter 56$b$, and the selector 60 calculates and outputs a value corresponding to "IM·(c·$2^b$)" in the formula (5).

In a case in which the coefficient c is "0", the selector 60 receives "0" as the shift control information SFT2, and outputs "0" as the shifted value IMS2. In a case in which the coefficient c is "1", the selector 60 receives "1" or "2" as the shift control information SFT2, and outputs the immediate value IM or a doubled value of the immediate value IM as the shifted value IMS2. In a case in which the coefficient c is "−1", the selector 60 receives "3" or "4" as the shift control information SFT2, and outputs the complement/IM or a doubled value of the complement/IM as the shifted value IMS2.

Note that, when the complement/IM is input to the terminal 3 of the selector 60, an additional bit attached to the complement/IM received from the complement generator 52 is not entered. Similarly, as the shifter 56$b$ outputs the shifted value IMS not including an additional bit, an additional bit is not entered to the terminal 4.

The add operation unit 62 is a full adder, for example. The add operation unit 62 generates an added value (=P·IM), and outputs the generated added value ADT to the register 67. Because of the above configuration, a multiplication operation of the immediate value IM and the constant P represented by the formula (5) can be performed by the immediate value calculator 50 having less logic depth than a multiplier implemented by a CSA. In other words, the immediate value calculator 50 can perform a multiplication operation of the constant P and the immediate value IM in a shorter execution time than a multiplier implemented by a CSA.

Further, in a case in which the coefficient c is "−1", the add operation unit 62 receives "1" as the carry information CARY. That is, since the add operation unit 62 adds the carry information CARY to the shifted value IMS2 which is the complement/IM generated by the complement generator 52, the add operation unit 62 can treat the shifted value IMS2 as two's complement. As the complement generator 52 does not generate the two's complement of the immediate value IM, and the two's complement is generated in the add operation unit 62 by using the carry information CARY, the complement generator 52 can have only an inverter (NOT gate) inverting each bit of the immediate value IM. Accordingly, a circuit scale of the complement generator 52 can be reduced, as compared to a complement generator configured to generate the two's complement.

FIG. 6 illustrates examples of the constant P that is configured in accordance with a total bit-length VL used by an immediate instruction and a bit-length E of each data used in a SIMD operation. For convenience of explanation, in FIG. 6, examples of the constant P are divided into four groups Gr's (GrA, GrB, GrC, and GrD), and is illustrated for each group. The groups Gr's are associated with respective predetermined calculation formulas, as illustrated in FIG. 6 (which are the formulas (6) to (9) to be described below). In each group Gr, a constant P obtained from a code CODE contained in an immediate instruction is one of the values surrounded by a single-thick frame. However, a constant P obtained from a code CODE contained in an immediate instruction is not limited to the values obtained by the calculation formulas illustrated in FIG. 6. A constant P may be obtained by other formulas, but needs to be expressed as "$2^a+c \cdot 2^b$". That is, the processing device 102 can execute immediate instructions for executing calculation of a constant P other than the constants P illustrated in FIG. 6, as long as the constant P fulfills the above formula (4).

The total bit-length VL is a bit-length (bit width) of each of the registers REGs illustrated in FIG. 3, and is determined for each processing device configured to perform an immediate instruction. The bit-length of the register REG is $2^n$ (n is an integer, more than 5 for example). In the case of the processing device 102 illustrated in FIG. 3, the total bit-length VL is 512 bits (n=9), and each of the registers REGs includes 8 sub-registers each of which has a bit-length of 64-bit. The bit-length E of each data used in a SIMD operation is one of 8, 16, 32, and 64 bits, which is determined in accordance with the instruction code ICODE. That is, there are four immediate instructions represented by the above mentioned formula (1), an instruction handling 8-bit data (vector), an instruction handling 16-bit data (vector), an instruction handling 32-bit data (vector), and an instruction handling 64-bit data (vector). Also, with respect to each of the formulas (2) to (4) mentioned above, four immediate instructions (instructions handling 8-bit, 16-bit, 32-bit, and 64-bit data) are defined.

Configurable values of the constant P, in a case in which the total bit-length VL is 512 bits, are illustrated in a frame of a double line. Note that the constant P varies depending on the bit-length E. Also, the processing device 102 having the (maximum) total bit-length VL of 512 bits can also perform an immediate instruction using configurable values of the constant P in a case in which the total bit-length VL is any of 256, 128, and 64 bits.

The constant P belonging to GrA is represented as the following formula (6). As illustrated in the formula (6), the constant P (belonging to GrA) is obtained by dividing the total bit-length VL by the bit-length E (bit-length of each data), which represents the number of data (vectors) used in a SIMD operation. In a case in which the total bit-length VL is 512 bits and the bit-length E is 8 bits, the constant P is 64.

Also, in a case in which the total bit-length VL is 512 bits and the bit-length E is 16 bits, the constant P is 32.

$$P=VL/E \tag{6}$$

The constant P belonging to GrB is represented as the following formula (7). The constant P belonging to GrC is represented as the following formula (8). Note that "VL/E mod 4" in the formula (8) represents a remainder after division of "VL/E" by "4". The constant P belonging to GrD is represented as the following formula (9). Note that "VL/E mod 3" in the formula (9) represents a remainder after division of "VL/E" by "3".

$$P=\text{"Smallest } 2^n \text{ that fulfills } (VL/E \leq 2^n)\text{"} \tag{7}$$

$$P=VL/E-(VL/E \bmod 4) \tag{8}$$

$$P=VL/E-(VL/E \bmod 3) \tag{9}$$

In a case in which the total bit-length VL is 512 bits, the constant calculator 16 (FIG. 4) calculates one of "64", "32", "16", "8", "63", "30", "15", and "6" as the constant P, based on the code CODE (FIG. 1) contained in the immediate instruction.

FIG. 7 is a diagram (table) illustrating a concept of an operation of the shift decoder 18 illustrated in FIG. 4. In the following description, a row in the table in FIG. 7 whose number of the leftmost column is "n" (where "n" is an integer between 1 and 19) may be referred to as a "row of No. n". Note that, in the present embodiment, the shift decoder 18 is configured such that all the values illustrated in the thick frame can be calculated as the constant P, based on the code CODE contained in the immediate instruction. The constant P can be expressed as "$2^a+c \cdot 2^b$", as illustrated in the above formula (4).

For example, in a case in which the instruction decoder 10 is configured to decode only codes CODEs contained in immediate instructions corresponding to the total bit-length VL of 512 bits, the shift decoder 18 can perform only a part of operations illustrated in FIG. 7. That is, the shift decoder 18 is expected to generate sets of the shift control information SFT1 and SFT2 and the carry information CARY, corresponding to the constants P illustrated in the rows of No. 6, 8, 9, 10, 11, 15, 16, and 17. Further, each value in the leftmost column (the column "No.") corresponds to a value of the code CODE contained in the immediate instruction.

The constant calculator 16 calculates the constant P corresponding to the code CODE contained in the immediate instruction (which corresponds to a value in the column "No."), and the shift decoder 18 calculates, from the constant P, exponents "a" and "b", and a coefficient "c" in the formula (4). Then, the shift decoder 18 outputs the value of the exponent "a" as the shift control information SFT1. Further, the shift decoder 18 outputs a value of the shift control information SFT2 depending on a combination of the coefficient "c" and the exponent "b". In a case in which the coefficient "c" is "0", the shift decoder 18 outputs "0" as the shift control information SFT2. In a case in which the coefficient "c" is "1" and the exponent "b" is "0", the shift decoder 18 outputs "1" as the shift control information SFT2. In a case in which the coefficient "c" is "1" and the exponent "b" is "1", the shift decoder 18 outputs "2" as the shift control information SFT2. In a case in which the coefficient "c" is "−1" and the exponent "b" is "0", the shift decoder 18 outputs "3" as the shift control information SFT2. In a case in which the coefficient "c" is "−1" and the exponent "b" is "1", the shift decoder 18 outputs "4" as the shift control information SFT2. Further, when the coefficient "c" is "0" or "1", the shift decoder 18 outputs "0" as the carry information CARY. Also, when the coefficient "c" is "−1", the shift decoder 18 outputs "1" as the carry information CARY.

Figure 8:
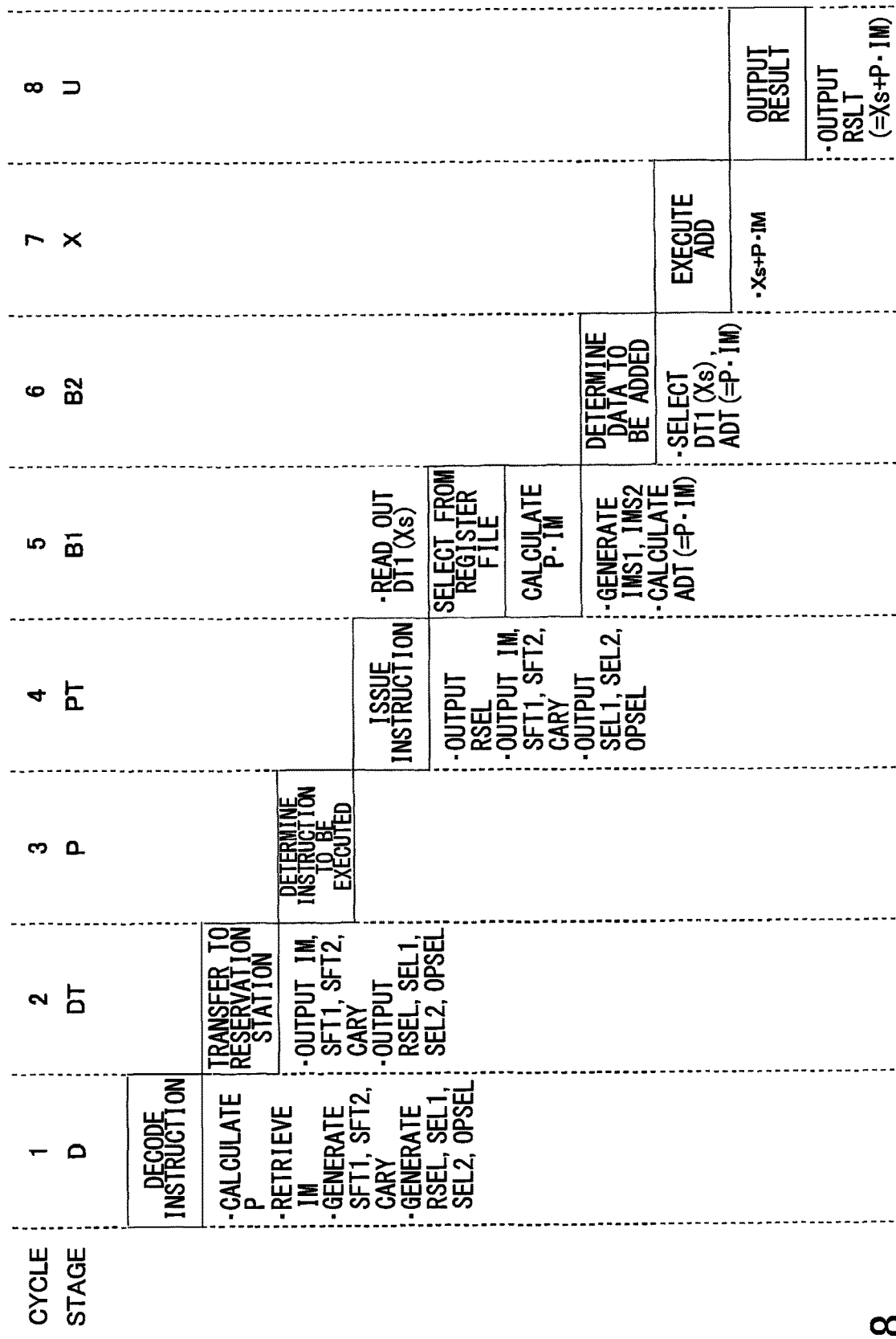
FIG. 8 is a diagram illustrating an example of operation of the processing device illustrated in FIG. 3 when an immediate instruction is executed.

FIG. 8 is a diagram illustrating an example of an operation of the processing device 102 illustrated in FIG. 3 when an immediate instruction is executed. That is, FIG. 8 illustrates an example of a control method of the processing device 102. The following mainly describes a case in which an immediate instruction illustrated in the formula (2) is executed, with reference to FIG. 8. The instruction pipeline in the processing device 102 includes multiple stages of D, DT, P, PT, B1, B2, X, and U, and each stage is executed in a single cycle (one clock cycle). In the following description, cycles for processes executed in the stages of D, DT, P, PT, B1, B2, X, and U may respectively be referred to as a D cycle, a DT cycle, a P cycle, a PT cycle, a B1 cycle, a B2 cycle, an X cycle, and a U cycle.

At the D cycle, the instruction decoder 10 decodes a received immediate instruction, calculates a constant P, and retrieves an immediate value IM from the immediate instruction. Based on the constant P, the instruction decoder 10 generates the shift control information SFT1 and SFT2 and the carry information CARY. The instruction decoder 10 further generates the selection information RSEL, SEL1, SEL2, OPSEL, and the like. However, when executing an immediate instruction not including an operation with respect to data Xs, as illustrated in the formula (1), the instruction decoder 10 does not generate the selection information RSEL for controlling an operation of the register file 30.

Next, at the DT cycle, the instruction decoder 10 transfers, to the reservation station 20, the immediate value IM, the shift control information SFT1 and SFT2, the carry information CARY, and the selection information RSEL, SEL1, SEL2, OPSEL, and the like.

Next, at the P cycle, the reservation station 20 determines an instruction to be issued, among multiple instructions retained in the buffer regions. FIG. 8 describes a case in which the reservation station 20 selects a buffer region retaining control information for executing an immediate instruction. In the case illustrated in FIG. 8, since the buffer region retaining control information for executing an immediate instruction is selected, the P cycle will be executed at a next cycle after the DT cycle. However, if the reservation station 20 selects another buffer region retaining control information for executing an instruction different from the immediate instruction, an empty cycle will be inserted between the DT cycle for executing an immediate instruction and the P cycle for executing the immediate instruction.

Next, at the PT cycle, the reservation station 20 issues the instruction, determined to be issued at the P cycle, to the arithmetic unit 40 and the register file 30. That is, the reservation station 20 outputs the selection information RSEL to the register file 30, and outputs, to the arithmetic unit 40, the immediate value IM, the shift control information SFT1 and SFT2, the carry information CARY, and the selection information SEL1, SEL2, and OPSEL.

Next, at the B1 cycle, the register file selects a register REG (Xs) based on the selection information RSEL, and reads out data DT1 (Xs) from the selected register REG. Also at the B1 cycle, the immediate value calculator 50 calculates a product of the constant P and the immediate value IM, based on the immediate value IM, the shift control information SFT1 and SFT2, and the carry information CARY, and outputs the product as an added value ADT. By calculating the product "P·IM" during the B1 cycle for reading out data from the register file 30, the data read out from the register file 30 and the product "P·IM" can be output to the arithmetic operation module 80 at the B2 cycle. Note that, in a case in which an immediate instruction illustrated in the formula (1) is to be executed, an operation for reading data from the register file 30 is not performed.

Next, at the B2 cycle, the arithmetic unit 40 determines data to be added by the adder ADD in the arithmetic operation module 80. That is, the selector 72 selects data DT1 (Xs) that is output from the register 92, based on the selection information SEL1, and outputs the selected data DT1 (Xs) to the register 93. Note that, in a case in which an immediate instruction illustrated in the formula (1) is to be executed, the selector 72 selects "0". The selector 74 selects the added value ADT (=P·IM) that is output from the immediate value calculator 50, based on the selection information SEL2, and outputs the selected added value ADT to to the register 94.

Next, at the X cycle, the adder ADD in the arithmetic operation module 80 executes an addition operation of the data DT1 (Xs) and the added value ADT (=P·IM) received from the registers 93 and 94 respectively, and outputs a result of the addition RSLT (Xs+P·IM) to the register 95. Note that, in a case in which an immediate instruction illustrated in the formula (1) is to be executed, the adder ADD executes an addition operation of "0" received from the register 93 and the added value ADT (=P·IM) received from the register 94, and outputs a result of the addition RSLT (P·IM) to the register 95. Because the selector 72 is caused to select "0" in the case in which an immediate instruction illustrated in the formula (1) is to be executed, the processing device 102 can perform all the immediate instructions illustrated in the formulas (1) to (3) by using the immediate value calculator 50 and the adder ADD, and an increase of a circuit scale can be prevented. Further, in a case in which an immediate instruction illustrated in the formula (3) is to be executed, the adder ADD executes a subtraction operation for subtracting the added value ADT (=P·IM) from the data DT1 (Xs), and outputs a result of the subtraction RSLT (Xs—P·IM) to the register 95.

Next, at the U cycle, the operation result RSLT (Xs+P·IM) is output from the register 95 (in a case in which the immediate instruction illustrated in the formula (2) is executed) and an execution of the immediate instruction terminates. If an immediate instruction illustrated in the formula (1) is executed, an operation result RSLT (P·IM) is output from the register 95 at the U cycle. If an immediate instruction illustrated in the formula (3) is executed, an operation result RSLT (Xs−P·IM) is output from the register 95 at the U cycle. The number of cycles required for executing the immediate instruction is 8, which is the same as the number of cycles required for executing a normal add instruction.

Figure 9:
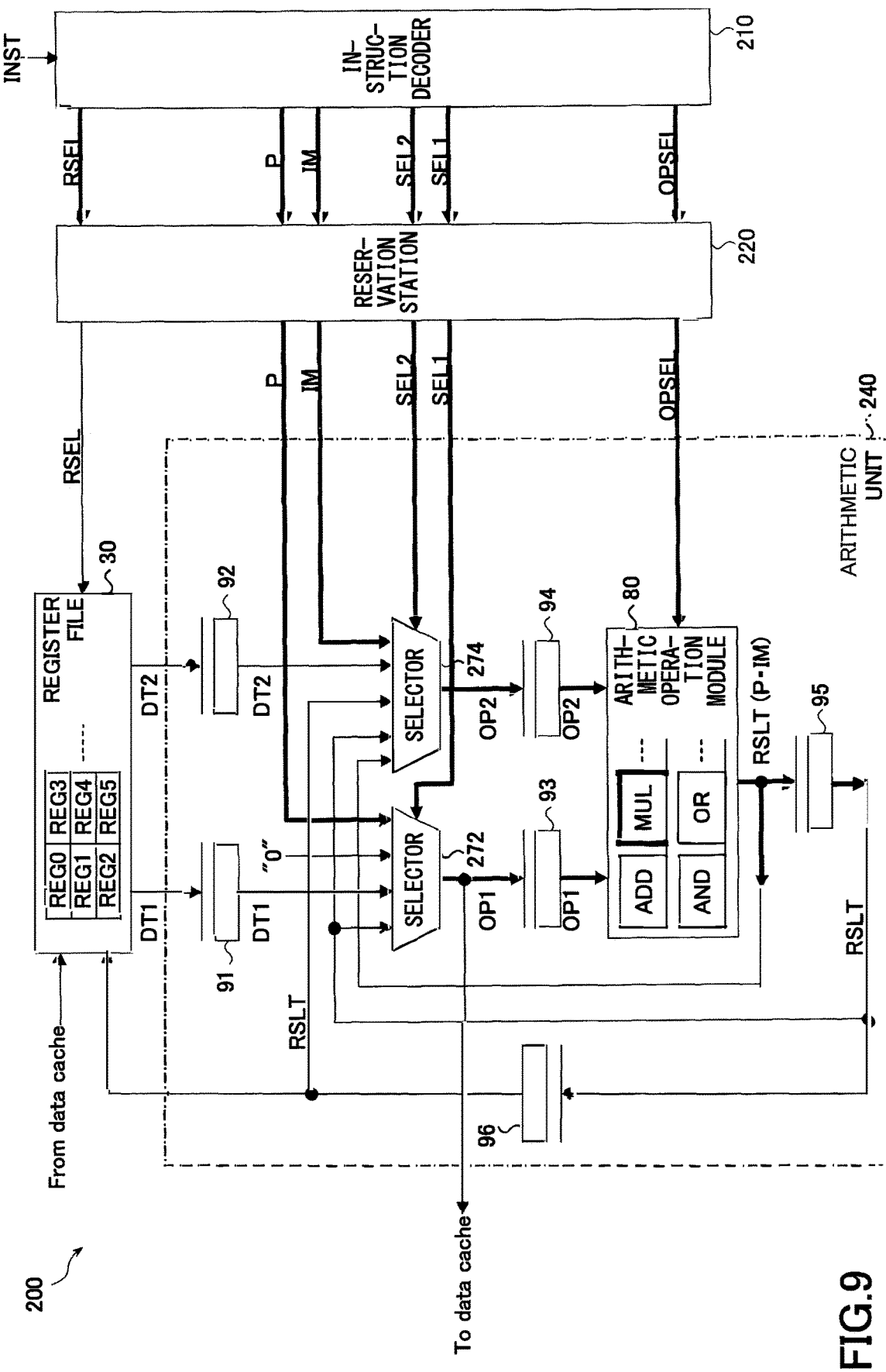
FIG. 9 and FIG. 10 are diagrams illustrating a configuration and an outline of an operation of another processing device.
Figure 10:
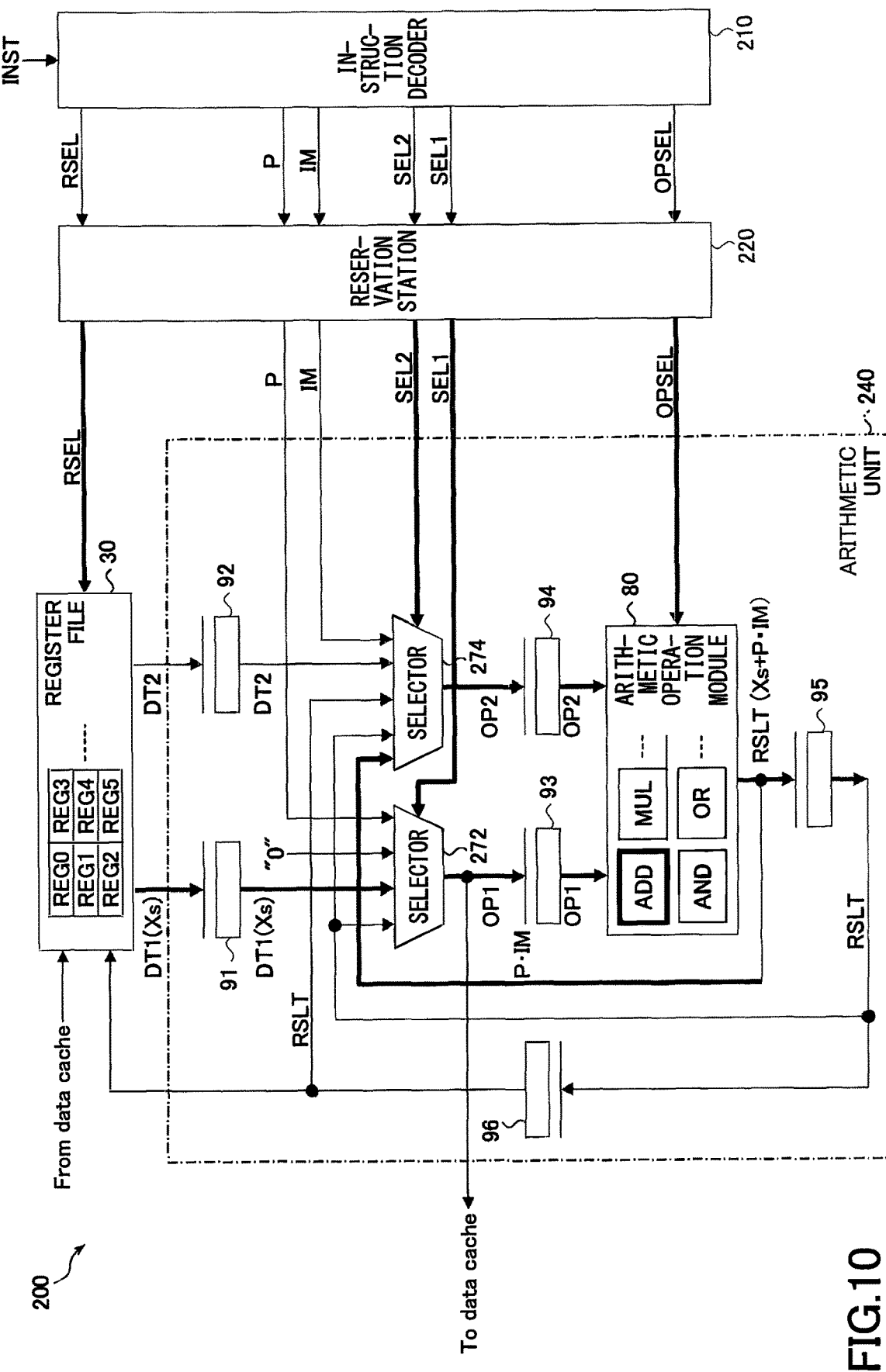

FIG. 9 and FIG. 10 are diagrams illustrating a configuration of another processing device 200 and an outline of an operation of the processing device 200. With respect to the similar element to that illustrated in FIG. 3, the same reference symbol is attached, and the detailed description of the element will be omitted. Thick lines illustrated in FIG. 9 and FIG. 10 represent flows of data or control information when an immediate instruction is executed, and an operation element used when an immediate instruction is executed. The processing device 200 includes an instruction decoder 210, a reservation station 220, a register file 30, and an arithmetic unit 240.

The instruction decoder 210 is a similar component to the instruction decoder 10 in FIG. 3, except a point that the instruction decoder 210 outputs a constant P, instead of the shift control information SFT1 and SFT2 and instead of the carry information CARY in the instruction decoder 10 in FIG. 3. In other words, the instruction decoder 210 does not include the shift decoder 18 illustrated in FIG. 4, and the instruction decoder 210 outputs the constant P calculated by the constant calculator 16 to the reservation station 220. The reservation station 220 is a similar component to the reservation station 20 in FIG. 3, except a point that the reservation station 220 retains the constant P instead of the shift control information SFT1 and SFT2, and the carry information CARY.

The arithmetic unit 240 differs from the arithmetic unit 40 illustrated in FIG. 3, in that the arithmetic unit 240 does not have the immediate value calculator 50 and in that the arithmetic unit 240 has selectors 272 and 274 instead of the selectors 72 and 74 illustrated in FIG. 3. With respect to other points, the arithmetic unit 240 is similar to the arithmetic unit 40. The selector 272 selects one of data output from the register 91, data output from the register 95, "0", and the constant P, based on the selection information SEL1, and outputs the selected data to the register 93 as operand data OP1. The selector 274 selects one of the immediate value IM, data output from the register 92, data output from the register 95, data output from the register 96, and an operation result RSLT output from the arithmetic operation module 80, based on the selection information SEL2, and outputs the selected data to the register 94 as operand data OP2.

As illustrated in FIG. 9, when the instruction decoder 210 decodes an immediate instruction, the instruction decoder 210 generates the selection information RSEL, the constant P, the immediate value IM, and the selection information SEL1, SEL2, and OPSEL. The selection information RSEL is used for reading out data from the register file (in FIG. 10). The selection information OPSEL includes information for operating a multiplier MUL in FIG. 9 and information for operating an adder ADD in FIG. 10.

The reservation station 220 outputs the constant P, the immediate value IM, and the selection information SEL1, SEL2, and OPSEL, to cause the multiplier MUL to perform an operation illustrated in the above formula (1), (2), or (3) to calculate a product of the constant P and the immediate value IM. The selector 272 selects the constant P based on the selection information SEL1, and outputs the selected constant P toward the arithmetic operation module 80. The selector 274 selects the immediate value IM based on the selection information SEL2, and outputs the selected immediate value IM toward the arithmetic operation module 80. Based on the selection information OPSEL, the arithmetic operation module 80 operates the multiplier MUL to multiply the constant P and the immediate value IM, and outputs a result of the multiplication RSLT (P·IM).

Next, in FIG. 10, the reservation station 220 outputs the selection information RSEL, SEL1, SEL2, and OPSEL, to cause the adder ADD to perform an add operation of data Xs and data (P·IM) illustrated in the above formula (2). The selector 272 selects, via the register 91, data DT1 (Xs) output from the register file 30 based on the selection information SEL1, and outputs the selected data DT1 (Xs) toward the arithmetic operation module 80. The selector 274 selects the result of the multiplication RSLT (P·IM) based on the selection information SEL2, and outputs the selected result of the multiplication RSLT (P·IM) toward the arithmetic operation module 80. Based on the selection information OPSEL, the arithmetic operation module 80 operates the adder ADD to add the data Xs and the result of the multiplication RSLT (P·IM), and outputs a result of the addition RSLT (Xs+P·IM).

As a result, the operation illustrated in the formula (2) (that is, the immediate instruction) is executed. In the processing device that does not have the immediate value calculator 50 illustrated in FIG. 3, an immediate instruction is executed by performing the two process flows illustrated in FIG. 9 and FIG. 10.

Figure 11:
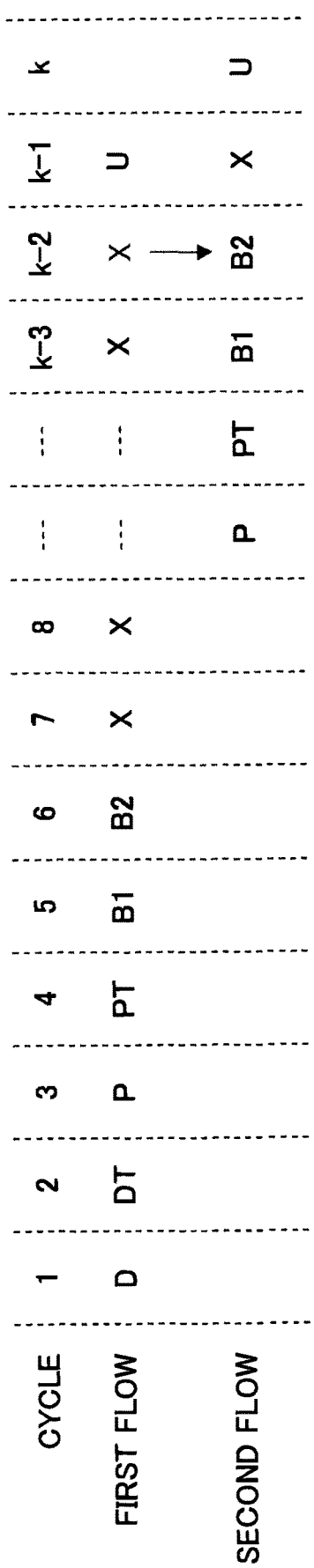
FIG. 11 is a diagram illustrating an example of operation of the processing device illustrated in FIG. 9 or FIG. 10 when an immediate instruction is executed.

FIG. 11 is a diagram illustrating an example of operation of the processing device 102 illustrated in FIG. 9 or FIG. 10 when an immediate instruction is executed. Regarding similar operations to those illustrated in FIG. 9, detailed description will be omitted. A first flow illustrated in FIG. 11 corresponds to the operation illustrated in FIG. 9, which is the multiplication operation of the constant P and the immediate value IM, and a second flow illustrated in FIG. 11 corresponds to the operation illustrated in FIG. 10, which is the add operation of the data Xs and the result of the multiplication P·IM.

At a D cycle in the first flow, the instruction decoder 210 decodes a received immediate instruction, retrieves an immediate value IM from the immediate instruction, calculates a constant P, and generates various control information to be output to the reservation station 220. Next, at the DT cycle, the instruction decoder 210 outputs the generated various control information to the reservation station 220.

Next, at the P cycle, the reservation station 220 determines to issue, to the arithmetic unit 240, control information for performing a multiplication of the constant P and the immediate value IM. Next, at the PT cycle, the reservation station 220 issues, to the arithmetic unit 240, the control information that was determined to be issued in the P cycle.

Next, at the B1 cycle, the register file 30 does not operate because the control information has not been received from the reservation station 220. Next, at the B2 cycle, by operations of the selectors 272 and 274, data to be entered to the arithmetic operation module 80 (that is, the constant P and the immediate value IM) is determined and the data is output to the multiplier MUL. The B2 cycle is followed by multiple X cycles. During the X cycles, the multiplier MUL performs a multiplication operation of the constant P and the immediate value IM. Because the multiplier MUL performs the multiplication operation using an internal CSA, multiple cycles are required to perform the multiplication. In the example illustrated in FIG. 11, the multiplier MUL obtains a result of the operation RSLT at cycle (k-2). The result of operation RSLT is transmitted to the selector 274 before the result of operation RSLT is stored into the register 95.

While the multiplication is being executed by the multiplier MUL, the second flow starts. First, at a P cycle in the second flow, the reservation station 220 determines to output the selection information RSEL, SEL1, SEL2, and OPSEL required for performing an addition of data Xs and the multiplication result (P·IM). Next, at a PT cycle, the reservation station 220 issues the selection information RSEL determined to be output at the P cycle to the register file 30, and issues the selection information SEL1, SEL2, and OPSEL determined to be output at the P cycle to the arithmetic unit 240.

Next, at a B1 cycle, the register file 30 selects a register REG retaining data Xs based on the selection information RSEL, and reads out data Xs from the selected register REG. Next, at a B2 cycle ((k-2) cycle), based on the selection information SEL1 and SEL2, the selectors 272 and 274 operate. The selector 272 selects the data Xs that is output from the register file 30, and outputs the selected data Xs toward the arithmetic operation module 80. The selector 274 selects data (P·IM), which is the result of operation RSLT fed from the arithmetic operation module 80, and outputs the selected data (P·IM) toward the arithmetic operation module 80.

Next, at an X cycle in the second flow, the adder ADD in the arithmetic operation module 80 executes an addition operation of the data Xs and the data (P·IM), based on the selection information OPSEL. That is, an addition operation illustrated in the formula (2) is performed. Next, at a U cycle, a result of the operation RSLT is output from the register 95, and an execution of the immediate instruction terminates.

As described above, the processing device according to the embodiment illustrated in FIGS. 3 to 8 can also provide a similar effect to the processing device according to the embodiment illustrated in FIG. 1. That is, the multiplication operation of "P·IM" (illustrated in formula (1), (2), or (3)) designated with an immediate instruction can be executed by the immediate value calculator 50 including the complement generator 52, the shifters 54, 56a and 56b, the selectors 58 and 60, and the add operation unit 62, instead of a multiplier MUL including a CSA. By using the immediate value calculator 50 having less logic depth than the multiplier MUL, a multiplication "P·IM" can be executed during a cycle for reading out data DT1 (Xs) from the register file 30. As a result, because an execution of an immediate instruction can be executed in the same number of cycles as that of an addition instruction executed by the adder ADD in the arithmetic operation module 80, a processing time can be reduced as compared to a case in which an immediate instruction is divided into two process flows and the two process flows are executed. Accordingly, a performance of the processing device 102 can be improved.

By providing the constant calculator 16 in the instruction decoder 10, even in a case in which an encoded constant P is embedded in an immediate instruction, the constant P can be calculated during the stage D for decoding an instruction (the immediate instruction). Also, as the shift decoder 18 generates the shift control information SFT1 and SFT2 and the carry information CARY based on the constant P, the multiplication "P·IM" can be executed during the cycle for reading out data DT1 (Xs) from the register file 30.

Further, because the processing device according to the embodiment illustrated in FIGS. 3 to 8 generates the two's complement by using the carry information CARY entered to the add operation unit 62, the complement generator 52 does not need to generate the two's complement of the immediate value IM, and the complement generator 52 is expected to only invert each bit of the immediate value IM to generate the ones' complement. Accordingly, a circuit scale of the complement generator 52 can be reduced, as compared to a complement generator configured to generate the two's complement. Further, in the processing device according to the embodiment illustrated in FIGS. 3 to 8, an operation of the immediate instruction illustrated in the formula (1) can be executed by causing the selector 72 to select "0". Therefore, because the processing device according to the embodiment illustrated in FIGS. 3 to 8 can perform all of the immediate instructions illustrated in the formulas (1) to (3) by using the immediate value calculator 50 and the adder ADD, an increase of a scale of a circuit can be prevented.

Further, a configuration of the processing device is not limited to the above described configuration. For example, in the above described embodiment, the complement generator 52 in the immediate value calculator 50 is configured to attach an additional bit "0" to the right of input data of the complement generator 52 (the immediate value IM) and to generate a complement (ones' complement) of the input data to which the additional bit is attached. However, in another embodiment, the complement generator 52 in the immediate value calculator 50 may be configured not to attach an additional bit "0" to the right of the immediate value IM and may be configured to send the complement/IM (not including the additional bit) to the shifter 56b. Instead, the shifter 56b may be configured such that, when the complement/IM is shifted to the left, the shifter 56b sets "1" to the least significant bit (LSB). Note that, in a case in which the immediate value calculator 50 includes another shifter 56b to shift the complement/IM to the left by n bits (where n is an integer more than one), the another shifter 56b sets "1" to lower n bits of the complement/IM having been shifted to the left by n bits.

For example, when the immediate value IM is "0011" in a binary representation, the complement generator 52 outputs "1100" as the complement/IM. Subsequently, when the shifter 56b receives the complement/IM (1100), the shifter 56b shifts the value "1100" to the left by 1 bit, and sets "1" to the LSB of the shifted value. As a result, the shifted value IMS obtained from the shifter 56b will be "1001".

According to the above detailed description, the features and the advantages of the embodiments will be made clear. All examples and conditional language provided herein are intended for pedagogical purposes of aiding the reader in understanding the invention and the concepts contributed by the inventors to further the art, and are not to be construed as limitation to such specifically recited examples and conditions, nor does the organization of such examples in the specification relate to a showing of superiority and inferiority of the invention. Although one or more embodiments of the present invention have been described in detail, it should be understood that various changes, substitutions, and alterations could be made hereto without departing from the spirit and scope of the invention.

What is claimed is:
1. A processing device comprising:
an instruction decoder configured to generate instruction information by decoding an instruction;
an arithmetic unit configured to perform an arithmetic operation based on the instruction information; and
a register file configured to retain data used for the arithmetic operation;
the instruction decoder including a shift control unit configured, in a case in which the instruction decoder has decoded an immediate instruction for instructing a calculation including generation of a product of an immediate value IM and a constant P expressed as $2^x+c \cdot 2^y$, where x and y are non-negative integers and c is one of "−1", "0", and "1",
to generate, as a part of the instruction information, a first shift control information and a second shift control information from the constant P,
the first shift control information being information causing the arithmetic unit to generate a first shifted value of the immediate value IM,
the second shift control information being information causing the arithmetic unit to generate a second shifted value of the immediate value IM,
the first shifted value of the immediate value IM corresponding to $IM \cdot 2^x$ that is generated by bit-shifting the immediate value IM by x bits,
the second shifted value of the immediate value IM corresponding to $IM \cdot c \cdot 2^y$ that is a value obtained by bit-shifting the immediate value IM by y bits, a value obtained by bit-shifting a complement of the immediate value IM by y bits, or "0";

the instruction decoder further being configured to output, to the arithmetic unit, the immediate value IM, the first shift control information, and the second shift control information;

the arithmetic unit including a first arithmetic operation module configured to calculate the product IM·P, and a second arithmetic operation module configured to calculate a sum of the product IM·P calculated by the first arithmetic operation module and data Xs retrieved from the register file, or to calculate a difference between the data Xs retrieved from the register file and the product IM·P calculated by the first arithmetic operation module by subtracting the product IM·P from the data Xs, the first arithmetic operation module including a first shift operation unit configured to generate the first shifted value of the immediate value IM in accordance with the first shift control information, a second shift operation unit configured to generate the second shifted value of the immediate value IM in accordance with the second shift control information, and an add operation unit configured to add the first shifted value of the immediate value IM generated by the first shift operation unit and the second shifted value of the immediate value IM generated by the second shift operation unit, in order to calculate the product IM·P.

2. The processing device according to claim 1, wherein the first arithmetic operation module operates during a cycle for transmitting data from the register file to the second arithmetic operation module.

3. The processing device according to claim 1, wherein the first shift operation unit includes first shifters configured to output shifted values of the immediate value IM, each of the first shifters being configured to bit-shift the immediate value IM by a different predetermined amount of bits not less than one from any other of the first shifters, and a first selector configured to select, as the first shifted value, one of the shifted values output from the first shifters and the immediate value IM output from the instruction decoder, based on the first shift control information;

the second shift operation unit includes second shifters configured to output shifted values of the immediate value IM, each of the second shifters being configured to bit-shift the immediate value IM by a different predetermined amount of bits not less than one from any other of the second shifters, and a complement generator configured to generate the complement, third shifters configured to output shifted values of the complement, each of the third shifters being configured to bit-shift the complement by different predetermined amount of bits not less than one from any other of the third shifters, and a second selector configured to select, as the second shifted value, one from a set of the shifted values output from the second shifters, the immediate value IM output from the instruction decoder, the shifted complements output from the third shifters, the complement generated by the complement generator, and "0", based on the second shift control information.

4. The processing device according to claim 3, wherein the complement generator is configured to generate the complement by inverting each bit of the immediate value IM, the shift control unit is configured to output carry information to the add operation unit, and the add operation unit is configured to calculate the product IM·P by adding the first shifted value, the second shifted value, and the carry information.

5. The processing device according to claim 1, wherein the shift control unit includes a constant calculator configured to calculate the constant P based on a code contained in the immediate instruction, and a control information generating unit configured to generate the first shift control information and the second control information.

6. The processing device according to claim 1, wherein the second arithmetic operation module is configured to perform an add operation of the product IM·P and "0", in a case in which the instruction decoder has decoded an immediate instruction for instructing to output the product of the immediate value IM and the constant P, without calculating the sum of the product IM·P and data retained in the register file or calculating a difference between the product IM·P and the data retained in the register file.

7. The processing device according to claim 1, further comprising an execution control unit configured to retain the instruction information and to output the retained instruction information in an order that the arithmetic unit can execute, wherein the first shift control information and the second shift control information output by the instruction decoder are output to the first arithmetic operation module via the execution control unit.

8. An arithmetic unit of a processing device, the arithmetic unit being configured to perform, in accordance with information received from an instruction decoder of the processing device, an arithmetic operation corresponding to an immediate instruction for instructing a calculation including generation of a product of an immediate value IM and a constant P expressed as $2^x+c\cdot 2^y$, where x and y are non-negative integers and c is one of "−1", "0", and "1", the arithmetic unit comprising:

a first arithmetic operation module configured to calculate the product IM·P; and a second arithmetic operation module configured to calculate a sum of the product IM·P calculated by the first arithmetic operation module and data Xs retained in a register file of the processing device, or to calculate a difference between the data Xs and the product IM·P calculated by the first arithmetic operation module by subtracting the product IM·P from the data Xs, the first arithmetic operation module including a first shift operation unit configured to receive the immediate value IM and a first shift control information from the instruction decoder, and to generate a first shifted value of the immediate value IM, the first shifted value corresponding to $IM\cdot 2^x$ that is generated by bit-shifting the immediate value IM by x bits in accordance with the first shift control information, a second shift operation unit configured to receive the immediate value IM and a second shift control information from the instruction decoder, and to generate a second shifted value of the immediate value IM, the second shifted value of the immediate value IM corresponding to $IM\cdot c\cdot 2^y$ that is a value obtained by bit-shifting the immediate value IM by y bits in accordance with the second shift control information, a value obtained by bit-shifting a complement of the immediate value IM by y bits in accordance with the second shift control information, or "0", and an add operation unit configured add the first shifted value of the immediate value IM generated by the first shift operation unit and the second shifted value of the immediate value IM generated by the second shift operation unit, in order to calculate the product IM·P, wherein the first shift operation unit includes first shifters configured to output shifted values of the immediate value IM, each of the first shifters being configured to bit-shift the immediate value IM by a different predetermined amount of bits not less than one from any other of the first shifters, and a first selector configured to select, as the first shifted value, one of the shifted values output from the first shifters and the immediate value IM output from the instruction decoder, based on the first shift control information;

the second shift operation unit includes second shifters configured to output shifted values of the immediate value IM, each of the second shifters being configured to bit-shift the immediate value IM by a different predetermined amount of bits not less than one from any other of the second shifters, a complement generator configured to generate the complement of the immediate value IM, third shifters configured to output shifted values of the complement, each of the third shifters being configured to bit-shift the complement by different predetermined amount of bits not less than one from any other of the third shifters, and a second selector configured to select, as the second shifted value, one from a set of the shifted values output from the second shifters, the immediate value IM output from the instruction decoder, the shifted complements output from the third shifters, the complement generated by the complement generator, and "0", based on the second shift control information.

9. A method of controlling a processing device including an instruction decoder configured to generate instruction information by decoding an instruction, an arithmetic unit configured to perform an arithmetic operation based on the instruction information, and a register file configured to retain data used for the arithmetic operation, the method comprising:

generating, in a case in which the instruction decoder has decoded an immediate instruction for instructing a calculation including generation of a product of an immediate value IM and a constant P expressed as $2^x+c\cdot2^y$, where x and y are non-negative integers and c is one of "−1", "0", and "1", a first shift control information and a second shift control information by the instruction decoder from the constant P, the first shift control information being information causing the arithmetic unit to generate a first shifted value of the immediate value IM, the second shift control information being information causing the arithmetic unit to generate a second shifted value of the immediate value IM, the first shifted value of the immediate value IM corresponding to $IM\cdot2^x$ that is generated by bit-shifting the immediate value IM by x bits, the second shifted value of the immediate value IM corresponding to $IM\cdot c\cdot2^y$ that is a value obtained by bit-shifting the immediate value IM by y bits, a value obtained by bit-shifting a complement of the immediate value IM by y bits, or "0";

outputting the immediate value IM, the first shift control information, and the second shift control information, by the instruction decoder to the arithmetic unit;

generating, by the arithmetic unit, the first shifted value of the immediate value IM in accordance with the first shift control information;

generating, by the arithmetic unit, the second shifted value of the immediate value IM in accordance with the second shift control information;

calculating, by the arithmetic unit, a sum of the first shifted value of the immediate value IM and the second shifted value of the immediate value IM in order to generate the product IM·P; and performing, by the arithmetic unit, an addition operation of the product IM·P and the data retained in the register file or a subtraction operation between the product IM·P and the data retained in the register file.

* * * * *